(12) United States Patent
Haupt

(10) Patent No.: US 6,334,159 B1
(45) Date of Patent: Dec. 25, 2001

(54) METHOD AND APPARATUS FOR SCHEDULING REQUESTS WITHIN A DATA PROCESSING SYSTEM

(75) Inventor: Michael Lee Haupt, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/219,286

(22) Filed: Dec. 22, 1998

(51) Int. Cl.[7] ............................... G06F 3/00; G06F 13/00
(52) U.S. Cl. ................. 710/6; 710/58; 709/102; 711/157
(58) Field of Search ..................... 710/100, 107, 710/113, 111, 112, 260, 265, 58, 60; 709/1, 100, 102, 103; 713/502; 711/100, 157

(56) References Cited

U.S. PATENT DOCUMENTS

| | | | | |
|---|---|---|---|---|
| 4,475,156 | * | 10/1984 | Federico et al. | 709/102 |
| 4,736,318 | * | 4/1988 | Delyani et al. | 709/103 |
| 4,800,521 | * | 1/1989 | Carter et al. | 709/102 |
| 4,980,824 | * | 12/1990 | Tulpule et al. | 709/106 |
| 5,012,409 | * | 4/1991 | Fletcher et al. | 709/103 |
| 5,274,809 | * | 12/1993 | Iwasaki et al. | 709/104 |
| 5,379,427 | * | 1/1995 | Hiroshima | 395/704 |
| 5,442,763 | * | 8/1995 | Bartfai et al. | 711/145 |
| 5,524,242 | * | 6/1996 | Aida et al. | 395/706 |
| 5,528,513 | * | 6/1996 | Vaitzblit et al. | 709/103 |
| 5,671,446 | * | 9/1997 | Rakity et al. | 710/54 |
| 5,790,813 | | 8/1998 | Whittaker | 395/293 |
| 5,832,262 | * | 11/1998 | Johnson et al. | 709/102 |
| 5,835,763 | * | 11/1998 | Klein | 709/101 |
| 5,872,993 | * | 2/1999 | Brown | 712/35 |
| 5,987,621 | * | 11/1999 | Duso et al. | 714/4 |
| 6,052,738 | * | 4/2000 | Muller et al. | 710/111 |

* cited by examiner

Primary Examiner—Xuan M. Thai
(74) Attorney, Agent, or Firm—Charles A. Johnson; Mark T. Starr; Crompton, Seager & Tufte, LLC

(57) ABSTRACT

A method and apparatus for scheduling the execution of selected requests received in a first-in-time sequence, such that two or more request types are executed in a particular sequence for increased performance. Briefly, the present invention identifies two or more requests that have two or more predetermined request types, and schedules the identified requests in an order that corresponds to the particular sequence.

22 Claims, 18 Drawing Sheets

DATA CROSSBAR (MDA)

POD DATA BLOCK

MSU DATA BLOCK

MEMORY CONTROLLER (MCA)

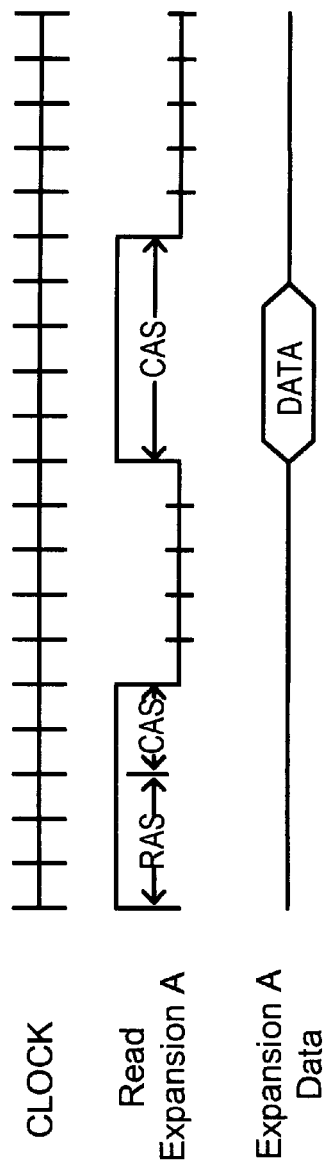
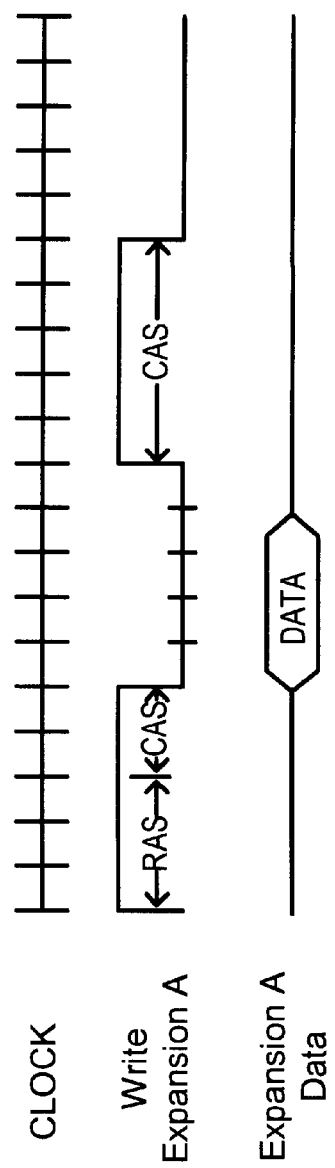

METHOD AND APPARATUS FOR SCHEDULING REQUESTS WITHIN A DATA PROCESSING SYSTEM

CROSS REFERENCE TO CO-PENDING APPLICATIONS

The present application is related to U.S. patent application Ser. No. 08/965,004, filed Nov. 5, 1997, entitled "A Directory-Based Cache Coherency System"; U.S. patent application Ser. No. 08/964,626, filed Nov. 5, 1997, entitled "Memory Optimization State"; U.S. patent application Ser. No. 09/001,592, filed Dec. 31, 1997, entitled "High-Performance Modular Memory System with Crossbar Connections"; U.S. patent application Ser. No. 09/001,588, filed Dec. 31, 1997, entitled "High-Speed Memory Storage Unit for a Multiprocessor System Having Integrated Directory and Data Storage Subsystems"; U.S. patent application Ser. No. 09/001,598, filed Dec. 31, 1997, entitled "Directory-Based Cache Coherency System Supporting Multiple Instruction Processor and Input/Output Caches"; and U.S. patent application Ser. No. 09/218,383, filed Dec. 22, 1998, entitled "Method and Apparatus for Substituting Requests Within a Data Processing System For Increased Performance", all of which are assigned to the assignee of the present invention and incorporated herein by reference.

BACKGROUND OF THE INVENTION

This invention relates generally to the field of data processing systems, and more particularly, to data processing systems that schedule the execution of selected requests to increase the performance of the system.

Most modem data processing systems include at least a processor and a memory. The processor is typically connected to the memory by a system bus or the like. Other system components may also be connected to the system bus including, for example, I/O modules, other processors, and/or other memory devices. During normal functional operation of the system, the processor typically executes a series of commands to accomplish a desired result. Some of these commands can result in read requests and write requests to the memory and are typically issued in the order of processor execution.

A read request typically provides a read address to the memory over the system bus. The memory reads the requested data from the location identified by the read address and returns the data to the processor for subsequent processing. Typically, the processor cannot process further commands until the processor receives the return data. In contrast, a write request typically provides a write address and write data packet to the memory over the system bus. The memory writes the write data to the write address. For a write request, no return data is typically expected, and thus, the processor can continue processing further commands immediately after the write request is provided to the system bus and/or memory. In many systems, the system bus operates at a lower speed than the processor. In addition, more than one system component may use the system bus and/or memory. For these and other reasons, the read and write requests issued by the processor may not be immediately serviced by the memory, thereby reducing the performance of the system.

To help alleviate this bottleneck, a write queue can be provided between the processor and the system bus to increase the speed at which the processor can issue write requests. As indicated above, no return data is typically expected from a write request, and thus the processor can continue processing further commands immediately after the write request is provided to the system bus and/or memory. The write queue is used to temporarily store write requests that are provided by the processor until the memory and/or system bus can service the write requests. This frees up the processor more quickly because the write queue, rather than the processor, waits for the system bus and/or memory to service the write request.

U.S. Pat. No. 5,790,813 to Wittaker discloses a pre-arbitration system and look-around circuit for increasing the throughput of a data processing system by allowing read requests to be executed prior to previously issued write requests so long as the data coherency of the system is not compromised. As noted above, read requests can slow processor throughput by not allowing the processor to process further commands until the read data is returned from the memory. Write requests, on the other hand, typically do not prevent the processor from processing further commands after the write request is issued. Thus, by assigning a higher priority to read requests relative to write requests, Wittaker suggests that the overall throughput of the data processing system may be increased.

Some data processing systems are configured such that the execution of two or more request types is faster when the requests are executed in a particular sequence. For example, the execution of two read requests followed by two write requests may be faster than the execution of a read, a write, a read, and finally a write request. In some systems, it is the transition from one request type to another that introduces a delay in the system. Therefore, it has been found that it may be more efficient to execute a string of a first request type followed by a string of another request type. Simply assigning a priority to one of the request types relative to the other request type, as suggested by Wittaker, typically will not provide the desired sequence of two or more different request types. Thus, it would be desirable to provide a data processing system that can schedule the execution of selected requests such that two or more request types are executed in a particular predetermined sequence to achieve increased system performance.

SUMMARY OF THE INVENTION

The present invention overcomes many of the disadvantages of the prior art by providing a method and apparatus for scheduling the execution of selected requests received in a first-in-time sequence, such that two or more request types are executed in a particular sequence for increased performance. Briefly, the present invention identifies two or more requests that have two or more predetermined request types, and schedules the identified requests in an order that corresponds to the particular sequence.

In one illustrative embodiment, a data processing system is provided where the execution of two read requests followed by two write requests is faster than the execution of a read, a write, a read, and finally a write request. This may be caused by any number of reasons. In the illustrative embodiment, however, it is the transition from one request type to another that introduces a delay into the system. Often, requests of the same request type can be interleaved more efficiently than requests of different request types. Thus, for some systems, including an illustrative embodiment, it may be more efficient to execute a number of requests of a first request type followed by a number of requests of another request type.

Preferably, each of the requests issued by the data processing system are stored in a queue. A selected number of first requests of the first request type are then identified by examining the requests stored in the queue. The identified first requests are then scheduled for execution and subsequently executed. Preferably, the identified first requests are scheduled and executed regardless of whether additional requests are provided to the queue after scheduling and/or execution is initiated. After the first requests are scheduled and/or executed, a selected number of second requests of the second request type are identified by examining the requests stored in the queue. The identified second requests are then scheduled for execution and executed.

It is contemplated that the execution of the first requests may be initiated before or after the selected number of second requests are completely scheduled and/or executed. Likewise, the execution of the selected number of second requests may be initiated before or after the selected number of first requests are completely scheduled and/or executed. In one illustrative embodiment, the number of first requests of the first request type may be continually scheduled and executed until all but "n" of the first requests that are stored in the queue are executed (where "n" is greater than or equal to zero). Likewise, the number of second requests of the second request type may be continuously scheduled and executed until all but "m" of the second requests stored in the queue are executed (where "m" is greater than or equal to zero). This may maximize the number of requests of each type that are executed in succession, and thus, minimize the number of transitions that occur between request types. It is recognized, that to maintain data coherency in some systems, it may also be desirable to ensure that all requests of a particular request type are executed in first-in-time sequence relative to all other requests of the same request type.

It is contemplated that the illustrative data processing system may include a memory with a number of memory locations, a first processor for issuing the number of requests to the memory, and a second processor coupled to the memory. In this configuration, the requests may include read-type requests and write-type requests. The read-type requests preferably submit an address to the memory, and in return, receive a read data packet from the memory. The write-type requests preferably submit an address and write data packet to the memory, wherein the memory writes the write data packet to the specified address in the memory. In this illustrative embodiment, the preferred predetermined sequence of requests includes two or more read requests followed by one or more write requests and/or one or more read requests followed by two or more write requests. However, other request sequences are contemplated and may depend on the particular data processing system used.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 10 is a timing diagram of a read request in an MSU Expansion;

FIG. 11 is a timing diagram of a write request in an MSU Expansion;

DETAILED DESCRIPTION OF THE PREFERRED EMBODIMENTS

The present invention provides a method and apparatus for scheduling the execution of selected requests received in a first-in-time sequence, such that two or more request types are executed in a particular sequence for increased performance. Briefly, the present invention identifies two or more requests that have two or more predetermined request types, and schedules the identified requests in an order that corresponds to the particular sequence. An illustrative data processing system is described below.

System Platform

Figure 1:
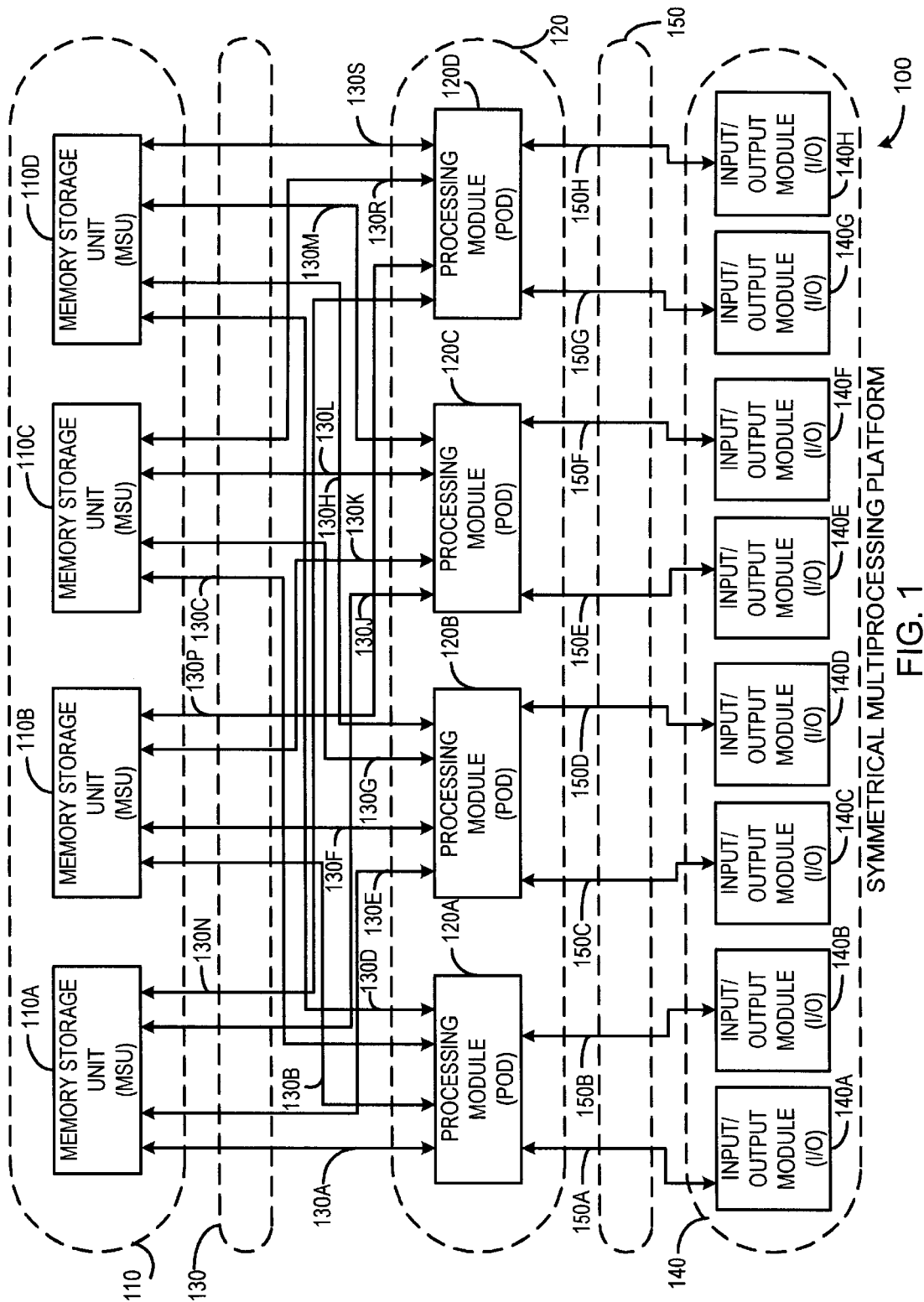
FIG. 1 is a block diagram of a Symmetrical Multi-Processor (SMP) System Platform according to a preferred embodiment of the present invention.

FIG. 1 is a block diagram of a Symmetrical Multi-Processor (SMP) System Platform according to a preferred embodiment of the present invention. System Platform 100 includes one or more Memory Storage Units (MSUs) in dashed block 110 individually shown as MSU 110A, MSU 110B, MSU 110C, and MSU 110D and one or more Processing Modules (PODs) in dashed block 120, individually shown as POD 120A, POD 120B, POD 120C, and POD 120D. Each unit in MSU 110 is interfaced to all PODs 120A, 120B, 120C, and 120D via a dedicated point-to-point connection referred to as an MSU Interface (MI) in dashed block 130, individually shown as 130A through 130S. For example, MI 130A interfaces POD 120A to MSU 110A, MI 130B interfaces POD 120A to MSU 110B, MI 130C interfaces POD 120A to MSU 110C, MI 130D interfaces POD 120A to MSU 110D, and so on.

In one embodiment of the present invention, MI 130 comprises separate bi-directional data and bi-directional address/command interconnections, and further includes uni-directional control lines that control the operation on the data and address/command interconnections (not individually shown). The control lines run at system clock frequency (SYSCLK) while the data bus runs source synchronous at two times the system clock frequency (2× SYSCLK). In a preferred embodiment of the present invention, the system clock frequency is 100 megahertz (MHz).

Any POD 120 has direct access to data in any MSU 110 via one of MIs 130. For example, MI 130A allows POD 120A direct access to MSU 110A, and MI 130F allows POD 120B direct access to MSU 110B. PODs 120 and MSUs 110 are discussed in further detail below.

System Platform 100 further comprises Input/Output (I/O) Modules in dashed block 140, individually shown as I/O Modules 140A through 140H, which provide the interface between various Input/Output devices and one of the PODs 120. Each I/O Module 140 is connected to one of the PODs across a dedicated point-to-point connection called the MIO Interface in dashed block 150, individually shown as 150A through 150H. For example, I/O Module 140A is connected to POD 120A via a dedicated point-to-point MIO Interface 150A. The MIO Interfaces 150 are similar to the MI Interfaces 130 but, in the preferred embodiment, have a transfer rate that is approximately half the transfer rate of the MI Interfaces because the I/O Modules 140 are located at a greater distance from the PODs 120 than are the MSUs 110.

Figure 2:
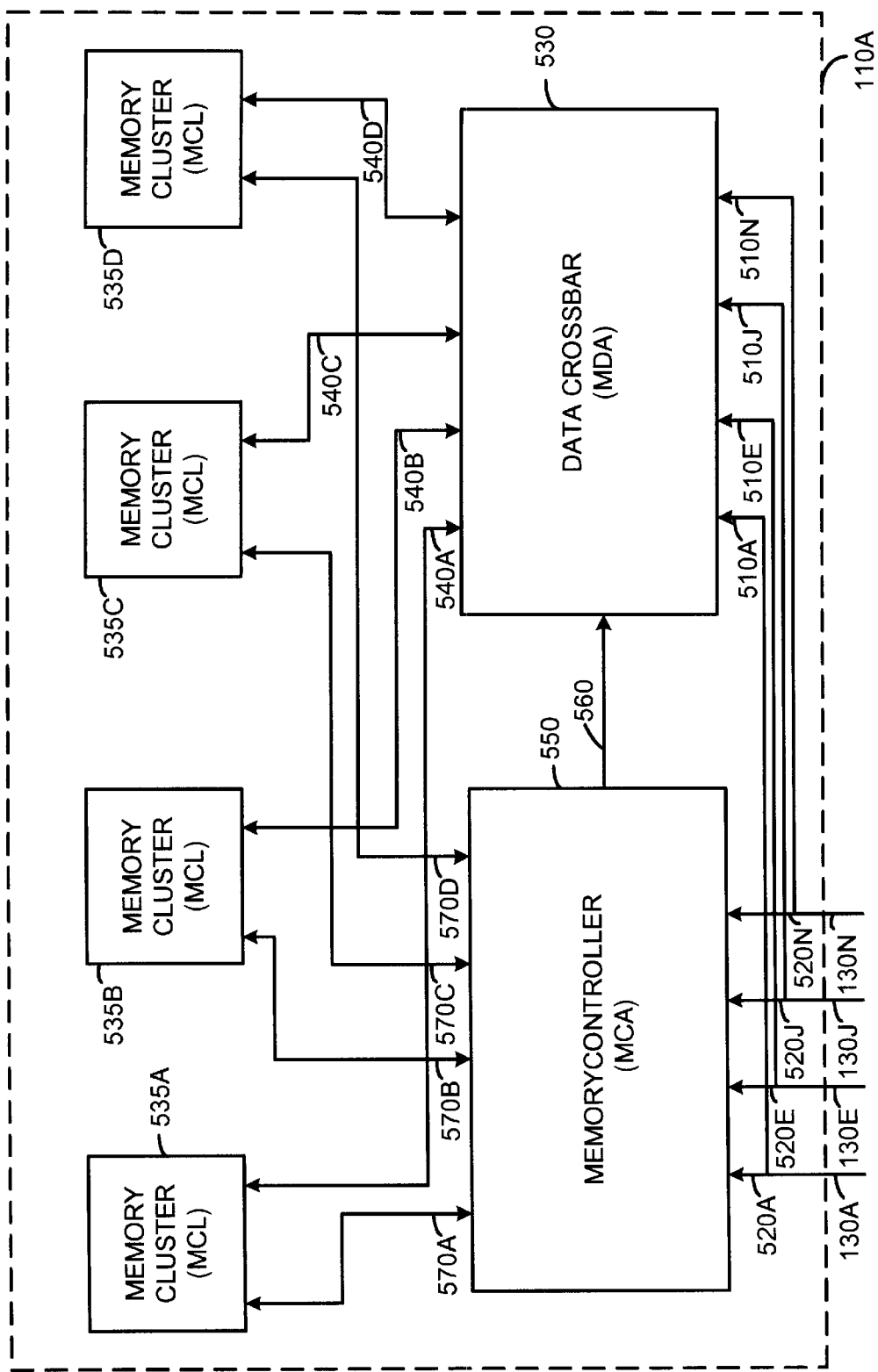
FIG. 2 is a block diagram of a Memory Storage Unit (MSU)

FIG. 2 is a block diagram of a Memory Storage Unit (MSU) 110. Although MSU 110A is shown and discussed, it is understood that this discussion applies equally to each of the MSUs 110. As discussed above, MSU 110A interfaces to each of the PODs 120A, 120B, 120C, and 120D across dedicated point-to-point MI Interfaces 130A, 130E, 130J, and 130N, respectively. Each MI Interface 130 contains Data Lines 510 (shown as 510A, 510E, 510J, and 510N), wherein each set of Data Lines 510 includes sixty-four (64) bi-directional data bits, data parity bits, data strobe lines, and error signals (not individually shown.) Each set of Data Lines 510 is therefore capable of transferring eight (8) bytes of data at one time. In addition, each MI Interface 130 includes bi-directional Address/command Lines 520 (shown as 520A, 520E, 520J, and 520N.) Each set of Address/command Lines 520 includes bi-directional address signals, a response signal, hold lines, address parity, and early warning and request/arbitrate lines.

A first set of uni-directional control lines from a POD to the MSU are associated with each set of the Data Lines 510, and a second set of uni-directional control lines from the MSU to each of the PODs are further associated with the Address/command Lines 520. Because the Data Lines 510 and the Address/command Lines 520 are each associated with individual control lines, the Data and Address information may be transferred across the MI Interfaces 130 in a split transaction mode. In other words, the Data Lines 510 and the Address/command Lines 520 are not transmitted in a lock-step manner.

In the preferred embodiment, the transfer rates of the Data Lines 510 and Address/control Lines 520 are different, with the data being transferred across the Data Lines at rate of approximately 200 Mega-Transfers per Second (MT/S), and the address/command information being transferred across the Address/command Lines at approximately 100 MT/S. During a typical data transfer, the address/command information is conveyed in two (2) transfers, whereas the associated data is transferred in a 64-byte packet called a cache line that requires eight (8) transfers to complete. The difference between data and address transfer rates and transfer lengths will be discussed further below.

Returning now to a discussion of FIG. 2, the Data Lines 510A, 510E, 510J, and 510N interface to the Memory Data Crossbar (MDA) 530. The MDA 530 buffers data received on Data Lines 510 and provides the switching mechanism that routes this data between the PODs 120 and an addressed one of the storage sub-units called Memory Cluster (MCLs) 535 (shown as 535A, 535B, 535C, and 535D). Besides buffering data to be transferred from any one of the PODs to any one of the MCLs, the MDA 530 also buffers data to be transferred from any one of the PODs to any other one of the PODs in a manner to be discussed further below. Finally, the MDA 520 is capable of receiving data from any one of the MCLs 535 on each of Data Buses 540 for delivery to any one of the PODs 120.

In the preferred embodiment, the MDA 530 is capable of simultaneously receiving data from one or more of the MI Interfaces 130 while simultaneously providing data to all of the other MI Interfaces 130. Each of the MI Interfaces is capable of operating at a transfer rate of 64 bits every five (5) nanoseconds (ns), or 1.6 gigabytes/second form a combined transfer rate across four (4) interfaces of 6.4 gigabytes/second. The MDA 530 is further capable of transferring data to, or receiving data from, each of the MCLs 535 across Data Buses 540 at a rate of 128 bits every 10 ns per Data Bus 540, for a total combined transfer rate across all Data Buses 540 of 6.4 gigabytes/second. Data Buses 540 require twice as long to perform a single data transfer operation (10 ns versus 5 ns) as compared to Data Lines 510 because Data Buses 540 are longer and support multiple loads (as is discussed below). It should be noted that since the MDA is capable of buffering data received from any of the MCLs and any of the PODs, up to eight unrelated data transfer operations may be occurring to and/or from the MDA at any given instant in time. Therefore, as mentioned above, the MDA is capable of routing data at a combined peak transfer rate of 12.8 gigabytes/second.

Control for the MDA 530 is provided by the Memory Controller (MCA) 550. MCA queues memory requests and provides timing and routing control information to the MDA across Control Lines 560. The MCA 550 also buffers address, command, and control information received on Address/command lines 520A, 520E, 520J, and 520N and provides request addresses to the appropriate memory device across Address Lines 570 (shown as 570A, 570B, 570C, and 570D) in a manner to be described further below. As discussed above, for operations that require access to the MCLs 535, the address information determines which of the MCLs 535 will receive the memory request. The command information indicates which type of operation is being performed. Possible commands include Fetch, Flush, Return, I/O Overwrite, and a Message Transfer, each of which will be described below. The control information provides timing and bus arbitration signals which are used by distributed state machines within the MCA 550 and the PODs 120 to control the transfer of data between the PODs and the MSUs. The use of the address, command, and control information will be discussed further below.

As mentioned above, the memory associated with MSU 110A is organized into up to four Memory Clusters (MCLs), shown as MCL 535A, MCL 535B, MCL 535C, and MCL 535D. However, the MSU may be populated with as few as one MCL if the user so desires. Each MCL includes arrays of Synchronous Dynamic Random Access memory (SDRAM) devices and associated drivers and transceivers. MCL 535A, 535B, 535C and 535D are each serviced by one of the independent bi-directional Data Buses 540A, 540B, 540C, 540D, respectively, where each of the Data Buses 540 includes 128 data bits. Each MCL 535A, 535B, 535C, and 535D is further serviced by one of the independent set of the Address Lines 570A, 570B, 570C, and 570D, respectively.

In the preferred embodiment, an MCL 535 requires twenty (20) clock cycles, or 200 ns, to complete a memory operation involving a cache line of data. In contrast, each of the Data Buses 540 are capable of transferring a 64-byte cache line of data to/from each of the MCLs 535 in five (5) bus cycles, wherein each bus cycle corresponds to one clock cycle. This five-cycle transfer includes one bus cycle for each of the four (4) 16-byte data transfer operations associated with a 64-byte cache line, plus an additional bus cycle to switch drivers on the bus. To resolve the discrepancy between the faster transfer rate of the Data Buses 540 and the slower access rate to the MCLs 535, the system is designed to allow four memory requests to be occurring simultaneously, but in varying phases of completion to a single MCL 535. To allow this interfacing of requests to occur, each set of Address Lines 570 includes two address buses and independent control lines as discussed below in reference to FIG. 3.

Directory Coherency Scheme of the Preferred Embodiment

Before discussing the memory structure in more detail, the data coherency scheme of the current system is discussed. Data coherency involves ensuring that each POD 120 operates on the latest copy of the data. Since multiple copies of the same data may exist within platform memory, including the copy in the MSU and additional copies in various local cache memories (local copies), some scheme is needed to control which data copy is considered the "latest" copy. The platform of the current invention uses a directory protocol to maintain data coherency. In a directory protocol, information associated with the status of units of data is stored in memory. This information is monitored and updated by a controller when a unit of data is requested by one of the PODs 120. In one embodiment of the present invention, this information includes the status of each 64-byte cache line. The status is updated when access to a cache line is granted to one of the PODs. The status information includes a vector which indicates the identity of the POD(s) having local copies of the cache line.

In the present invention, the status of the cache line includes "shared" and "exclusive." Shared status means that one or more PODs have a local copy of the cache line for read-only purposes. A POD having shared access to a cache line may not update the cache line. Thus, for example, PODs 120A and 120B may have shared access to a cache line such that a copy of the cache line exists in the Third-Level Caches 410 of both PODs for read-only purposes.

In contrast to shared status, exclusive status, which is also referred to as exclusive ownership, indicates that a only one POD "owns" the cache line. A POD must gain exclusive ownership of a cache line before data within the cache line may be modified. When a POD has exclusive ownership of a cache line, no other POD may have a copy of that cache line in any of its associated caches.

Before a POD can gain exclusive ownership of a cache line, any other PODs having copies of that cache line must complete any in-progress operations to that cache line. Then, if one or more POD(s) have shared access to the cache line, the POD(s) must designate their local copies of the cache line as invalid. This is known as a Purge operation. If, on the other hand, a single POD has exclusive ownership of the requested cache line, and the local copy has been modified, the local copy must be returned to the MSU before the new POD can gain exclusive ownership of the cache line. This is known as a "Return" operation, since the previous exclusive owner returns the cache line to the MSU so it can be provided to the requesting POD, which becomes the new exclusive owner. In addition, the updated cache line is written to the MSU sometime after the Return operation has been performed, and the directory state information is updated to reflect the new status of the cache line data. In the case of either a Purge or Return operation, the POD(s) having previous access rights to the data may no longer use the old local copy of the cache line which is invalid. These POD(s) may only access the cache line after regaining access rights in the manner discussed above.

In addition to Return operations, PODs also provide data to be written back to an MSU during Flush operations as follows. When a POD receives a cache line from an MSU, and the cache line is to be copied to a cache that is already full, space must be allocated in the cache for the new data. Therefore, a predetermined algorithm is used to determine which older cache line(s) will be disposed of or "aged out of" cache to provide the amount of space needed for the new information. If the older data has never been modified, it may be merely overwritten with the new data. However, if the older data has been modified, the cache line including the older data must be written back to the MSU 110 during a Flush Operation so that this latest copy of the data is preserved.

Data is also written to an MSU 110 during I/O Overwrite operations. An I/O Overwrite occurs when one of the I/O Modules 140 issues an I/O Overwrite command to the MSU. This causes data provided by the I/O Module to overwrite the addressed data in the MSU. The Overwrite operation is performed regardless of which other PODs have local copies of the data when the Overwrite operation is performed. Those PODs with copies are told to purge their copies of the data. The directory state information is updated to indicate that the affected cache line(s) is "Present" in the MSU, meaning the MSU has ownership of the cache line and no valid copies of the cache line exist anywhere else in the system.

In addition to having ownership following an Overwrite operation, the MSU is also said to have ownership of a cache line when the MSU has the most current copy of the data and no other agents have a valid local copy of the data. This could occur, for example, after a POD having exclusive data ownership performs a Flush operation of one or more cache lines so that the MSU thereafter has the only valid copy of the data.

Memory Clusters

Figure 3:
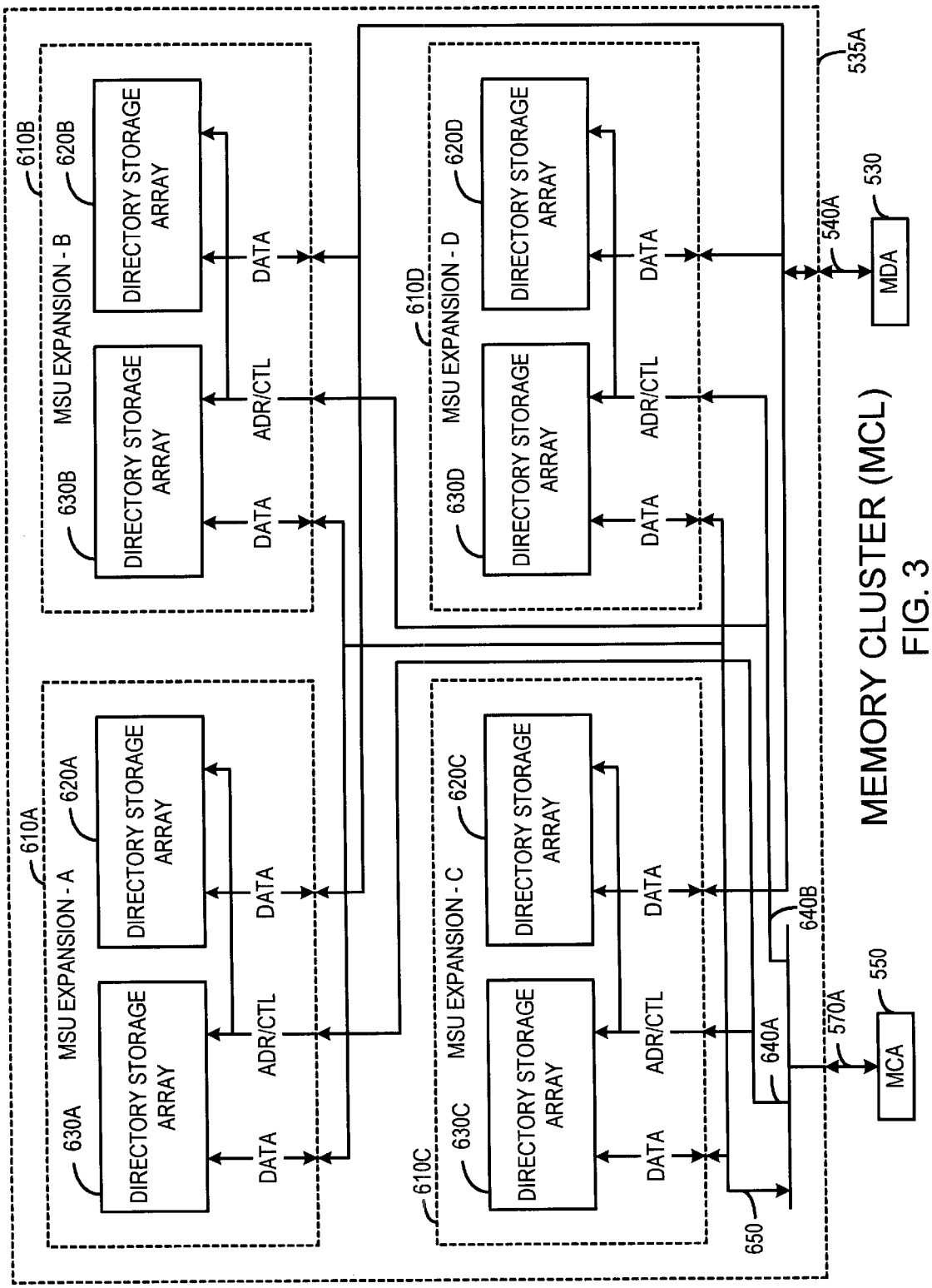
FIG. 3 is a block diagram of a Memory Cluster (MCL)

FIG. 3 is a block diagram of a Memory Cluster (MCL) 535A. Although MCL 535A is shown and described, the following discussion applies equally to all MCLs 535. An MCL contains between one and four MSU Expansions 610A, 610B, 610C, and 610D as dictated by user needs. A minimally-populated MSU 110 will contain at least one MSU Expansion 610. Each MSU Expansion 610 includes two (2) Dual In-line Memory Modules (DIMMs, not individually shown). Since a fully populated MSU 110 includes up to four (4) MCLs 535, and a fully populated MCL includes up to four (4) MSU Expansions, a fully populated MSU 110 includes up to sixteen (16) MSU Expansions 610 and thirty-two (32) DIMMs. The DIMMs can be populated with various sizes of commercially available SDRAMs as determined by user needs. In the preferred embodiment, the DIMMs are populated with either 64 Mbyte, 128 Mbyte, or 256 Mbyte SDRAMs. Using the largest capacity DIMM, the MSU 110 of the preferred embodiment has a maximum capacity of 16 gigabytes of data storage, or 64 gigabytes of data storage in an SMP Platform 100 having four (4) MSUs. Additional storage is provided for the directory state information, and parity and error bits will be discussed below.

Each MSU Expansion 610 contains two arrays of logical storage, Data Storage Array 620 (shown as 620A, 620B, 620C, and 620D) and Directory Storage Array 630 (shown as 630A, 630B, 630C, and 630D). MSU Expansion 610A includes Data Storage Array 620A and Directory Storage Array 630A, and so on.

Each Data Storage Array 620 is 128 data bits wide, and further includes twenty-eight (28) check bits and four (4) error bits (not individually shown). This information is divided into four (4) independent Error Detection and Correction (ECC) fields, each including thirty-two (32) data bits, seven (7) check bits, and an error bit. An ECC field provides Single Bit Error Correction (SBEC), Double Bit Error Detection (DED), and guarantees error detection within a field of any four (4) adjacent data bits. Since each Data Storage Array 620 is composed of SDRAM devices which are each eight (8) data bits wide, full device failure detection can be ensured by splitting the eight (8) bits from each SDRAM device into separate ECC field.

Each of the Data Storage Arrays 620 interfaces to the bi-directional Data Bus 540A, which also interfaces with the MDA 530. Each of the Data Storage Arrays further receives selected ones of the uni-directional Address Lines 570A driven by the MCA 550. As discussed above, each of the Address Lines 570A includes two Address Buses 640 (shown as 640A and 640B), one for each pair of MSU Expansions 610. Data Storage Arrays 620A and 620C receive Address Bus 640A, and Data Storage Arrays 620B and 620D receive Address Bus 640B. This dual address bus structure allows multiple memory transfer operations to be occurring simultaneously to each of the Data Storage Arrays within an MCL 535, thereby allowing the slower memory access rates to more closely match the data transfer rates achieved on Data Buses 540.

Each addressable storage location within the Directory Storage Arrays 630 contains nine (9) bits of directory state information and five (5) check bits for providing single-bit error correction and double-bit error detection on the directory state information. The directory state information includes the status bits used to maintain the directory coherency scheme discussed above. Each of the Directory Storage Arrays is coupled to one of the Address Buses 640 from the MCA 550. Directory Storage Arrays 630A and 630C are coupled to Address Bus 640A, and Directory Storage Arrays 630B and 630D are coupled to Address Bus 640B. Each of the Directory Storage Arrays further receives a bi-directional Directory Data Bus 650, which is included in Address Lines 570A, and which is used to update the directory state information.

The Data Storage Arrays 620 provide the main memory for the SMP Platform. During a read of one of the Data Storage Arrays 620 by one of the Sub-PODs 210 or one of the I/O Modules 140, address signals and control lines are presented to a selected MSU Expansion 610 in the timing sequence required by the commercially-available SDRAMs populating the MSU Expansions. The MSU Expansion is selected based on the request address. After a fixed delay, the Data Storage Array 620 included within the selected MSU Expansion 610 provides the requested cache line during a series of four (4) 128-bit data transfers, with one transfer occurring every ten (10) ns. After each of the transfers, each of the SDRAMs in the Data Storage Array 620 automatically increments the address internally in predetermined fashion. At the same time, the Directory Storage Array 630 included within the selected MSU Expansion 610 performs a read-modify-write operation. Directory state information associated with the addressed cache line is provided from the Directory Storage Array across the Directory Data Bus 650 to the MCA 550. The MCA updates the directory state information and writes it back to the Directory Storage Array in a manner to be discussed further below.

During a memory write operation, the MCA 550 drives Address Lines 640 to the one of the MSU Expansions 610 selected by the request address. The Address Lines are driven in the timing sequence required by the commercially-available SDRAMs populating the MSU Expansion 610. The MDA 530 then provides the sixty-four (64) bytes of write data to the selected Data Storage Array 620 using the timing sequences required by the SDRAMs. Address incrementation occurs within the SDRAMs in a similar manner to that described above.

Data Crossbar

Figure 4:
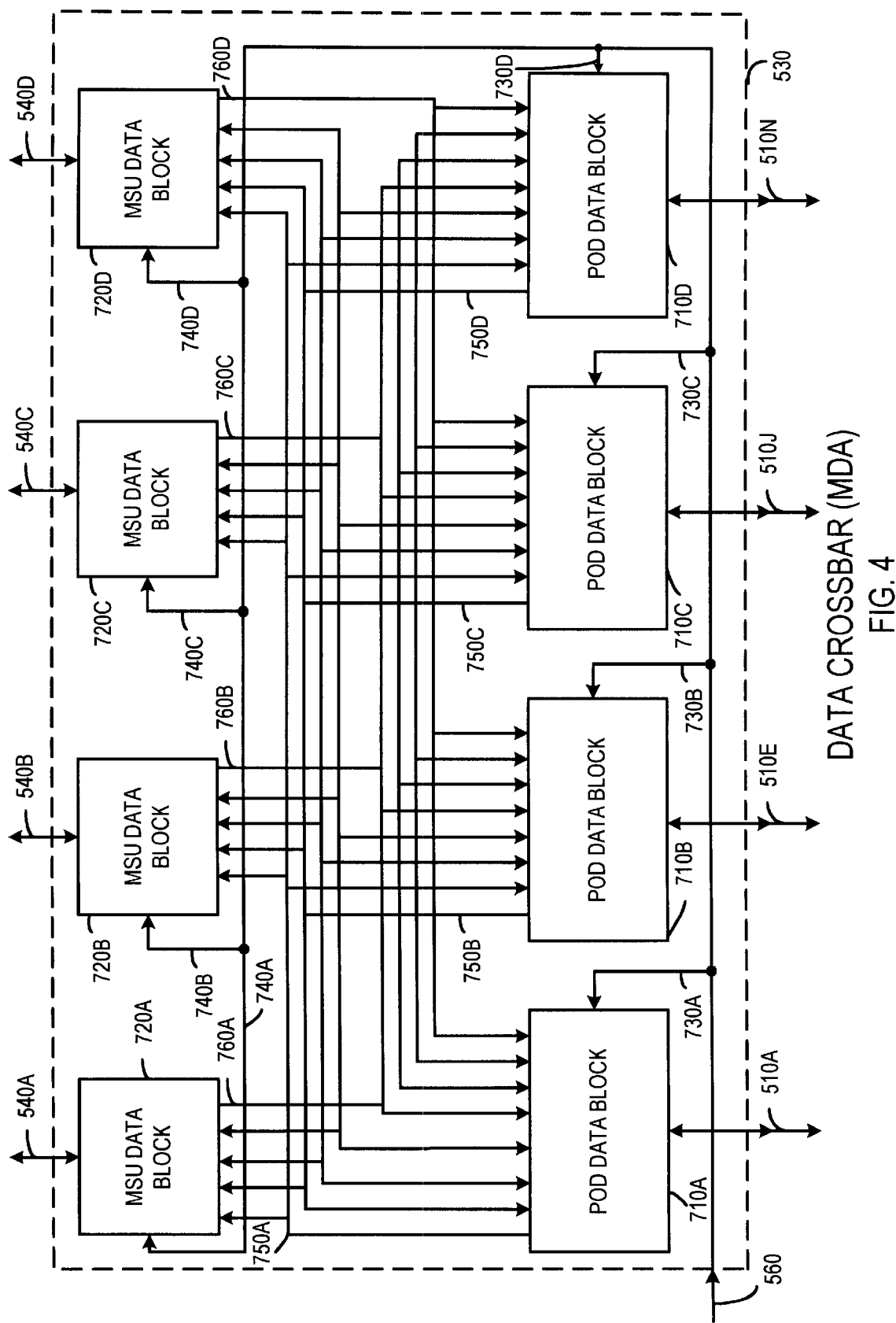
FIG. 4 is a block diagram of the Data Crossbar (MDA)

FIG. 4 is a block diagram of the Data Crossbar (MDA) 530. Although MDA 530 of MSU 110A is shown and discussed, this discussion applies equally to all MDAs 530 in the system. POD Data Blocks 710, shown as POD Data Blocks 710A, 710B, 710C, and 710D interface to PODs 120A, 120B, 120C, and 120D, respectively, over Data Lines 510A, 510E, 510J, and 510N, respectively. POD Data Blocks 710 buffer the data sent to, and received from, the respective one of the PODs 120. MDA 530 further includes MSU Data Blocks 720A, 720B, 720C, and 720D, which are interconnected to MCLs 535A, 535B, 535C, and 535D over Data Buses 540A, 540B, 540C, and 540D, respectively. MSU Data Blocks 720 buffer data sent to, and received from, the respective MCL 535. The MCA 550 provides the control for the POD Data Blocks 710 and the MSU Data Blocks 720 on Control Line 560. Control Line 560 includes independent control lines to each of the POD Data Blocks 710 (shown as POD Data Block Control Lines 730A, 730B, 730C, and 730D) so that each POD Data Block 710 can run in parallel. Control Line 560 further includes independent control lines to each of the MSU Data Blocks (shown as MSU Data Block Control Lines 740A, 740B, 740C, and 740D) so that each MSU Data Block 720 can run in parallel.

Each POD Data Block 710 drives all of the MSU Data Blocks 720 and all other POD Data Blocks 710 on Lines 750 (shown as 750A, 750B, 750C, and 750D) with two (2) independent 128-bit sets of data signals (not individually shown). For example, POD Data Block 710A drives Line 750A, which includes two (2) independent 128-bit sets of data signals that are each driven to each of the MSU Data Blocks 720 and to each of the other POD Data Blocks 710. Each of the independent 128-bit sets of data signals included in each of Lines 750 is uni-directional and is used to transfer updated memory data to a selected one of the MSU Data Blocks 720 during a Return, Flush, or I/O Overwrite Operation. Each of the sets of data signals on Lines 750 also transfers message data or an updated cache line from one POD 120 to another POD during Message or Return Operations, respectively.

Each MSU Data Block 720 drives all of the POD Data Blocks 710 on Lines 760 (shown as 760A, 760B, 760C, and 760D). Each of Lines 760 includes two (2) independent 128-bit sets of data signals that drive each of the POD Data Blocks 710. For example, MSU Data Block 720A drives Line 760A, which includes two (2) independent 128-bit sets of data signals that are driven to each of the POD Data Blocks 710. Each of the independent 128-bit sets of data signals included in each of Lines 750 is uni-directional and is used to transfer data from the MCLs 535 to the PODs 120 during read operations when the directory state information associated with the addressed cache line indicates the cache line is "Present" in the MSU, indicating that the most recent copy of the data is owned by the MSU 110.

POD Data Block

Figure 5:
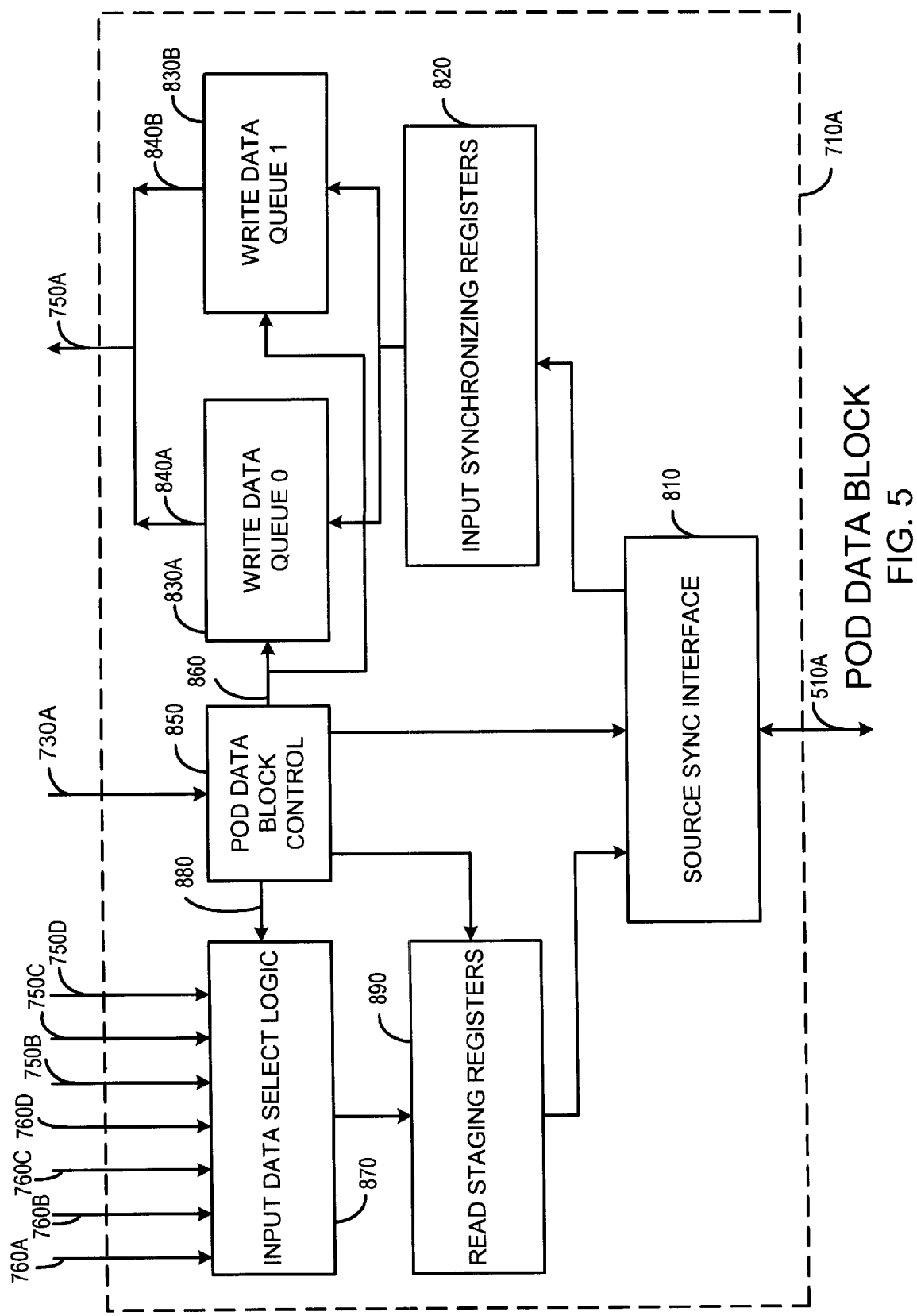
FIG. 5 is a block diagram of POD Data Block.

FIG. 5 is a block diagram of POD Data Block 710A. Although POD Data Block 710A is shown and described, the discussion applies to any of the POD Data Blocks 710. As discussed above, the POD Data Blocks buffer and route data between the PODs 120 and the MSU Data Blocks 720. The data may include cache lines from either one of the PODs 120 or one of the MCLs 535 or may comprise message data from one of the PODs.

When data is received from one of the PODs during a Return, Flush, I/O Overwrite, or Message Operation, the Source Sync Interface 810 receives data on 64-bit Data Lines 510A using strobe lines which are provided by POD 120A along with the data. The Source Sync Interface provides the data to the Input Synchronizing Registers 820, where the data is captured by latches on the active edge of the MSU clock without adding any meta-stability wait periods. This provides maximum throughput.

After the data is synchronized within the MSU 110A, the data is routed to either Write Data Queue 0 830A or Write Data Queue 1 830B depending on which one is least full. If both of the Write Data Queues contain an equal number of write requests, the data is routed to Write Data Queue 0 830A. Each of the Write Data Queues can store up to eight (8) cache lines of data.

As mentioned above, Line 750A includes two (2) independent 128-bit sets of Data Signals labeled 840A and 840B. Write Data Queue 0 830A drives Data Signals 840A, and Write Data Queue 1 830B drives Data Signals 840B. Both of these sets of Data Signals 840A and 840B are provided to all of the MSU Data Blocks 720, and to all other POD Data Blocks 710, and both may be driven simultaneously.

During transfer operations, MCA 550 provides control signals on one(s) of the POD Data Block Control Lines 730 and one(s) of the MSU Data Block Control Lines 740 to enable the requested transfer of data as determined by the addresses on Address/command Lines 520. If a POD Data Block 710 is sending the data, control information is received on Control Line 730 (shown as Control Line 730A) by POD Data Block Control 850. In turn, POD Data Block Control 850 generates control signals on Line 860 which enables one of the Write Data Queues 830. The selected one of the Write Data Queues 830 drives the respective one of the Data Signals 840, thereby providing data to either an MSU Data Block 720, or to another POD Data Block 710.

If the POD Data Block 710 is receiving data, the data may be received either from another POD 710 (for example, during a Return or a Message Operation), or the data may be received from an MSU Data Block 720 (during a Fetch operation). When data is received from another POD Data Block 710, the data is received on the respective one of Lines 750 (shown as 750B, 750C, and 750D) by Input Data Select Logic 870. POD Data Block Control 850 provides control signals on Line 880 to enable Input Data Select Logic 870 to select the data and route it to the Read Staging Registers 890 where it is temporarily stored. Since the Source Sync Interface 810 is bi-directional, and since POD 120A may be sending data on Data Lines 510A at any instant in time, the data stored in the Read Staging Registers 890 may be held for a short period of time before the interface becomes available. Read Staging Registers 890 eventually provides the data to the Source Sync Interface 810, which in turn forwards it to POD 120A via Data Lines 510A. If the data was instead received from one of the MSU Data Blocks 720, the transfer operation would be similar to that discussed above except the data would be received by Input Data Select Logic 870 on the respective one of Lines 760A, 760B, 760C, or 760D.

The POD Data Block is capable of staging data into the Read Staging Registers 890 at the same time the Source Sync Interface is receiving data from or transferring unrelated data to POD 120A. Meanwhile, both Write Data Queues 840A and 840B may each be providing data to a respective one of the MSU Data Blocks 720. Therefore, four (4) transfer operations involving POD 120A can be occurring simultaneously.

MSU Data Block

Figure 6:
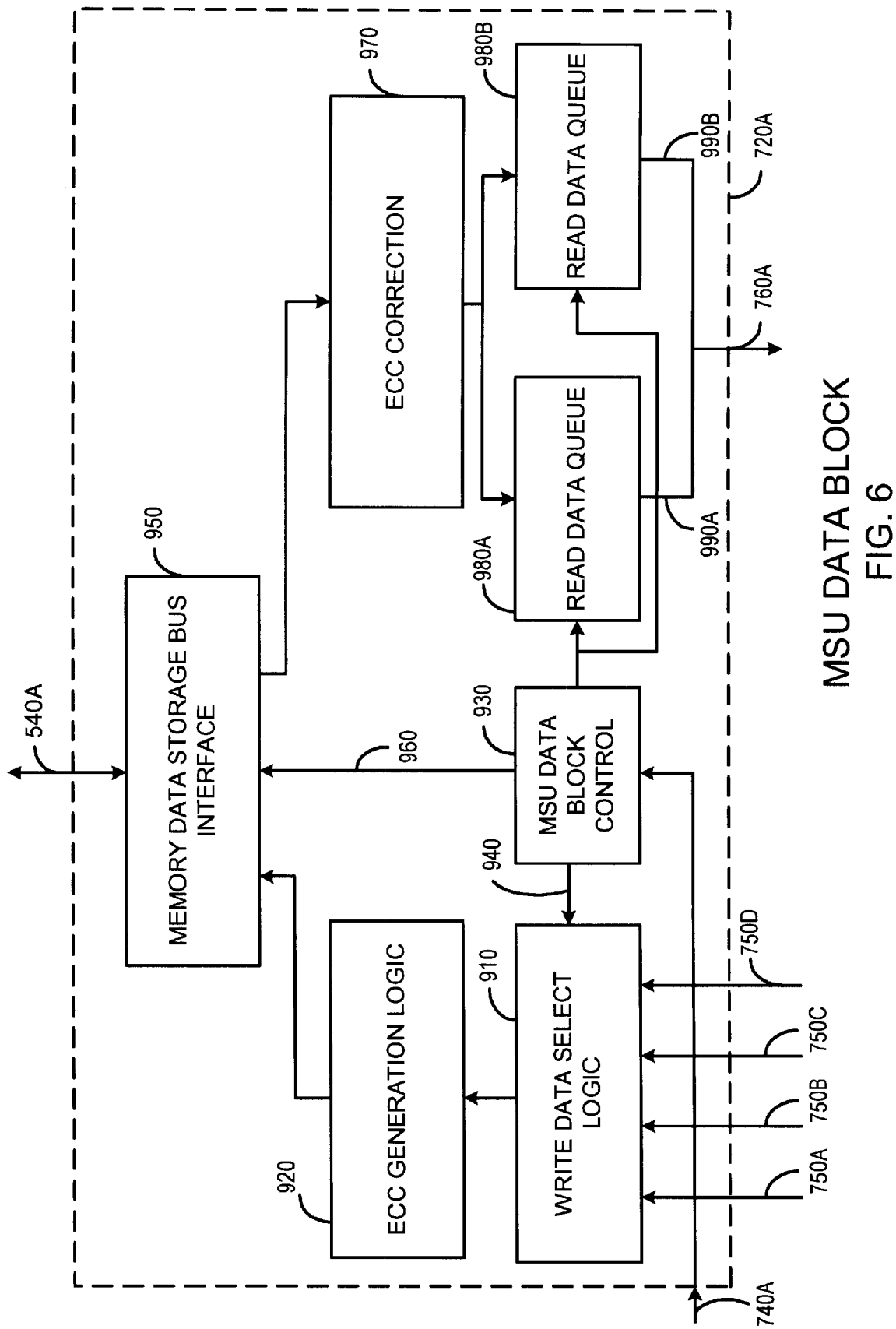
FIG. 6 is a block diagram of the MSU Data Block.

FIG. 6 is a block diagram of the MSU Data Block. Although MSU Data Block 720A is shown and described, it is understood that this discussion applies equally to all MSU Data Blocks 720. The MSU Data Blocks buffer and route data between POD Data Blocks 710 and the MCLs 535. During a POD-to-MCL write operation, data is received from one(s) of the POD Data Blocks 710A, 710B, 710C, and 710D on Lines 750A, 750B, 750C, and 750D, respectively. As discussed above, each of Lines 750 includes two (2) independent 128-bit sets of data signals that can each be transferring data simultaneously during two (2) different data transfer operations. The Write Data Select Logic 910 selects the appropriate set of data signals to be routed to ECC Generation Logic 920. The data selection is controlled by MSU Data Block Control 930, which receives MSU Data Block Control Line 740A from the MCA 550 and in turn generates Control Line 940 to the Write Data Select Logic.

After the 128 bits of data is routed to the ECC Generation Logic 920, the ECC Generation Logic strips the parity and generates the appropriate check bits required for the Single-Bit Error Correction/Double-Bit Error Detection (SBEC/DED) scheme employed to protect the data integrity. The ECC Generation Logic 920 transfers the data to the Memory Data Storage Bus Interface 950, which is capable of storing two (2) cache lines of data. A cache line is stored within Memory Data Storage Bus Interface prior to being transferred to an MCL so that once the actual memory operation to the MCL is initiated, the time required to transfer the data from a POD Data Block 710 to an MSU Data Block 720 is not imposed as overhead in the ensuing memory operation. The MSU Data Block Control 930 provides control information to the Memory Data Storage Bus Interface 950 on Line 960, thereby enabling the Memory Data Storage Bus Interface so that data is provided on Data Bus 540A to MCL 535A according to the timing sequence required by the SDRAMs within the MSU Expansions 610.

During a read operation, the MCA 550 provides control information to the MSU Data Block Control 930 on Line 740A prior to data being received from MCL 535 A on Data Bus 540A. In response, MSU Data Block Control 930 generates control signals which are provided on Line 960 to the Memory Data Storage Bus Interface 950 to allow the Memory Data Storage Bus Interface to receive the data from the addressed one of the MSU Expansions 610 within MCL 535A. As this data is being read, it is passed to the ECC Corrections Logic 970 which corrects any single bit errors and detects multiple bit errors (MUEs). If a MUE is detected, an error indicator is returned with the data to the requesting POD 120 so the error can be handled.

After being processed by the ECC Correction Logic 970, the data is provided to one of two Read Data Queues 980A and 980B. The data is stored in the Read Data Queue which is least full. Each Read Data Queue 980 can store up to four (4) cache lines of data. When the stored data reaches the front of the Read Data Queue 980A or 980B, it is provided on the associated one of the Data Lines 990A or 990B, respectively, to the selected one of the POD Data Blocks 710 as controlled by MCA 550. Each of the Data Lines 990 includes 128 bits, and each of the Data Lines is capable of performing transfers simultaneously. Data Lines 990A and 990B are shown collectively as Lines 760A. MSU Data Block 720A is therefore capable of performing three (3) transfer operations in parallel, data may be routed from one of Lines 750 to Data Bus 540A at the same time a data transfer is being performed on each Lines 990A and 990B to a respective POD Data Block 710.

Memory Controller

Figure 7:
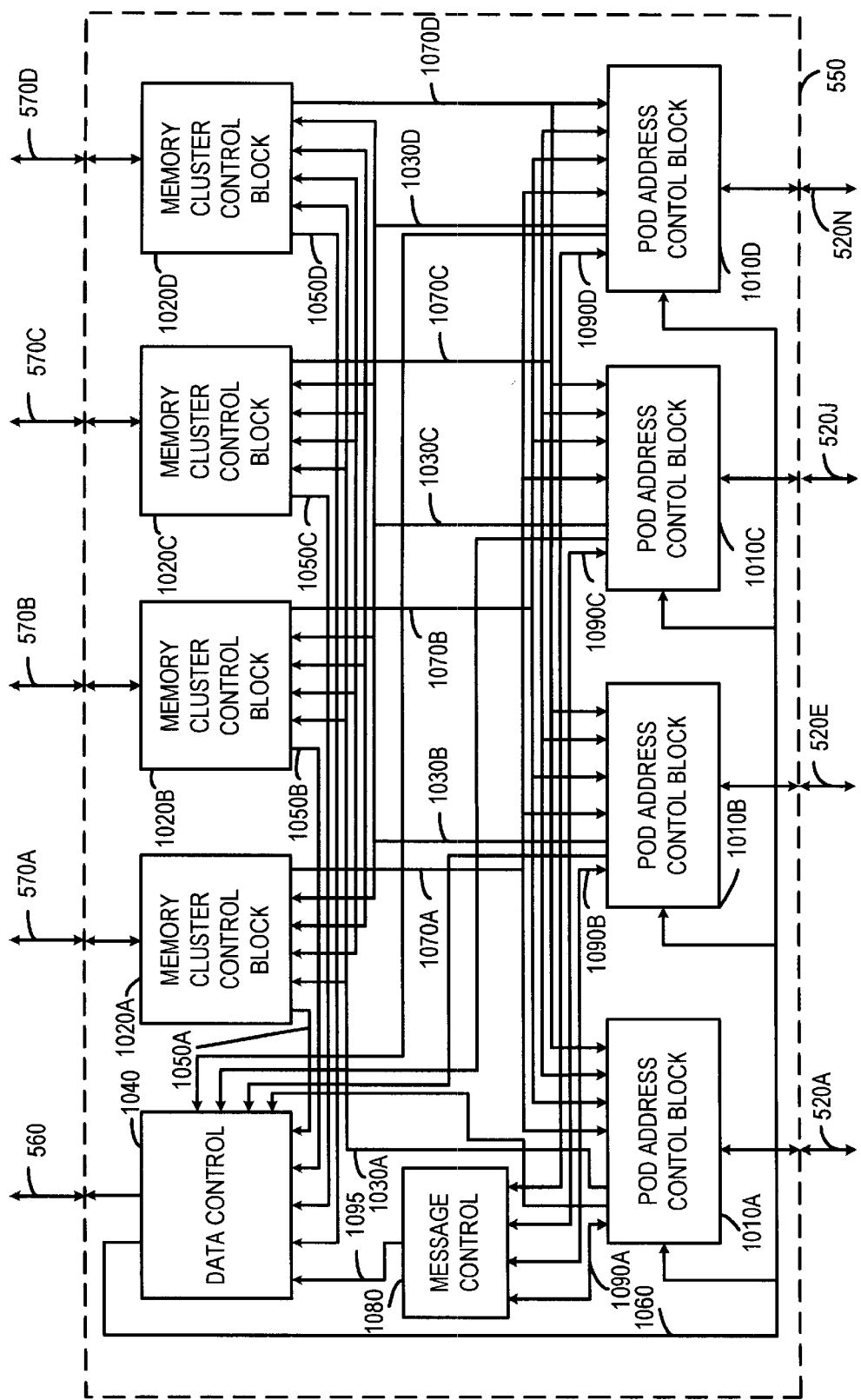
FIG. 7 is a block diagram of the Memory Controller (MCA)

FIG. 7 is a block diagram of the Memory Controller (MCA) 550. Although the following discussion specifically describes logic within MSU 110A, it is understood that this discussion applies equally to all MCAs included within all MSUs within Platform 100. The MCA 550 provides the control for data transfers occurring within the MDA 530. As discussed above, these transfers basically involve three (3) types of operations: writing a cache line from a POD 120 to an MCL 535, reading a cache line from an MCL 535 to a POD 120, and transferring data (either Message or Return data) from one POD 120 to another POD 120. MCA 550 controls each of these operations which are described in turn below.

A POD 120 writes a cache line to an MCL in three situations: during Flush, I/O Overwrite, and Return Operations. The MCA operation during a Return Operation is discussed below in association with the execution of Fetch operations, and the MCA operation during Flush and Overwrite operations is discussed as follows.

Flush operations occur when modified data is aged out of a POD's Second Level Cache 460 or Third Level Cache 410 and is written back to one of the MSUs 110. I/O Overwrite operations occur when the I/O is providing new data that is to replace whatever data currently is stored within a specified address within an MSU. In either instance, logic within the Crossbar Module 220 of the requesting one of the PODs 120A, 120B, 120C, and 120D determines which MSU 110 is mapped to a particular request address. As discussed above, each MSU is mapped to a predetermined range or range(s) of addresses within the entire range of the main memory address space.

The POD provides the address and associated command to the appropriate MSU 110 via respective ones of the Address/command Lines 520. For example, POD 120A provides an address and command over Address/command Lines 520A to POD Address Control Block 1010A, and so on. Address/command Lines 520 include bi-directional address signals, an output response signal, and various request, arbitrate, and hold lines to control the flow of information to and from the respective one of the PODs 120. The address, command, and associated control information is stored within a respective one of the POD Address Control Blocks 1010A, 1010B, 1010C, and 1010D until it is selected as being associated with the next request to process.

When an address is selected as the next request address to process, it is provided to a selected one of the Memory Cluster Control Blocks 1020A, 1020B, 1020C, and 1020D via uni-directional address/control signals shown as Lines 1030A, 1030B, 1030C, and 1030D, respectively, based on the address. In a fully populated MSU, each of the Memory Cluster Control Blocks 1020 handles one-fourth of the address range of the MSU. The selected Memory Cluster Control Blocks 1020A, 1020B, 1020C, and 1020D stores an address until it is selected for presentation to the associated MCL 535A, 535B, 535C, and 535D, respectively, across Address Lines 570A, 570B, 570C, and 570D, respectively. For example, addresses from Memory Cluster Control Block 1020A are presented to MCL 535A across Address Lines 570A, and so on. Memory Cluster Control 1020 selects an address for transfer to an MCL 535 based on which MSU Expansion 610 within the MCL 535 becomes available first to accept another request as will be discussed further below.

When a Memory Cluster Control Block 1020 selects an address for transfer to one of the MCLs 535, the Memory Cluster Control Block makes a request to Data Control 1040 on an associated Request Line 1050 (shown as Request Lines 1050A, 1050B, 1050C, and 1050D). For example, prior to a transfer of an address from Memory Cluster Control Block 1020A to MCL 535A, Memory Cluster Control Block makes a request on Line 1050A to Data Control 1040. In response, Data Control 1040 provides the necessary control information on Line 560 to the POD Data Block 710 and MSU Data Block 720 participating in the transfer. During a Flush or I/O Overwrite operation, the appropriate one of the POD Data Blocks 710 is enabled to provide data to one of the MSU Data Blocks 720, which in turn is enabled to provide data to the associated one of the MCLs 535. This occurs as the address is provided by the associated one of the Memory Cluster Control Blocks 1020 to the MCL.

Turning now to the operation of the MCA 550 during Fetch operations, Fetch operations are initiated in the same manner as described above. One of the PODs 120 provides the request address to the respective one of the POD Address Control Blocks 1010, where the address is queued, and eventually transferred to the addressed Memory Cluster Control Block 1020. When the address is selected as the next address to be presented to the associated MCL 535, the Memory Cluster Control Block 1020 issues a request to the Data Control 1040. Sometime after the request is made, the Data Control 1040 provides the associated control to the MDA 530 on Line 560 to enable the appropriate MSU Data Block 720 to receive the cache line from the addressed MCL 535. The cache line is stored in one of the Read Data Queues 980 as discussed above.

In addition to the cache line, the MCL also provides nine (9) bits of directory state information from the addressed Directory Storage Arrays 630 to the MCA 550 over the respective one of Lines 570. Logic in the associated Memory Cluster Control Block uses the directory state information to determine if the cache line is Present in the MSU 110, meaning that the MSU "owns" the latest copy of the cache line data. If the MSU does own the requested cache line, the MCA controls the transfer of the cache line from the MSU Data Block 720 to the POD Data Block 710 associated with the requesting POD, and further controls the subsequent transfer of the cache line to the requesting POD. As the data is being provided to the POD Data Block 710, Data Control 1040 also provides control information on Line 1060, which causes the appropriate POD Address Control Block 1010 to issue the required response for the transfer. During a Fetch operation, the response is generated to the requesting POD when the first data transfer for a cache line is provided on lines 510. Part of the information in the response includes a "job number" used to associate the data with a particular request. The job number is necessary because a POD may have up to sixteen (16) requests pending to main memory at any given time, and these requests may not necessarily be serviced in order. Therefore, the POD must be informed as to which outstanding request is associated with the returned data.

As discussed above, a POD may also initiate a Fetch operation for a cache line that the MSU does not own. If the directory state information retrieved from the Directory Storage Array 630 indicates another POD has exclusive ownership of that data, the MCA controls initiation of a Return Operation. This results in the retrieval of the latest copy of the cache line from the POD 120 that owns the data. In these cases, the MCA transfers the address associated with the requested cache line from the Memory Cluster Control Block 1020 to the appropriate one of the POD Address Control Blocks 1010A, 1010B, 1010C, or 1010D over the associated interface shown as Line 1070A, 1070B, 1070C, or 1070D, respectively. Since each Memory Cluster Control 1020 operates independently, there is a separate address bus from each Memory Cluster Control Block to each POD Address Control Block 1010 such that each POD Address Control Block can receive up to four (4) address requests simultaneously. The POD Address Control Block stores the pending request addresses until they can be presented in a serial manner to the associated POD over bi-directional Address/command Lines 520 along with a Return function.

When an address and an associated Return function are presented to a POD 120 over the associated Address/command Lines 520, the address is forwarded to the cache (either the Third Level Cache 410 or a Second Level Cache 460) that stores the current copy of the data in a manner which is beyond the scope of this invention. For more information on cache coherency in the Platform of the present invention, see the co-pending Application entitled "A Directory-Based Cache Coherency System," Ser. No. 08/965,004 filed Nov. 5, 1997. After any in-progress operations are completed on the requested cache line, it is returned to the MSU 110 on the associated one of Data Lines 510. Up to four (4) return functions may be initiated from an MSU simultaneously. Furthermore, up to thirty-two (32) return functions may be outstanding to the PODs at any given instant in time. The PODs need not respond to these return functions in the order in which the functions were issued.

When a POD 120 returns a cache line in response to a return function, it is stored within one of the Write Data Queues 830 within the POD Data Block 710 for that POD. Data Control 1040 generates control signals on Line 560 to cause the cache line to be transferred via the respective one of Lines 750 to the POD Data Block 710 associated with the requesting POD 120. In addition, the MCA 550 controls the transfer of the cache line from the POD Data Block 710 which is associated with the previous owner to the appropriate MSU Data Block 720 associated with the cache line address, and finally to the addressed MCL 535 so that the MSU has the latest copy of the data. The Memory Cluster Control Block 1020 associated with the addressed MCL 535 generates updated directory state information which reflects the new access status of the data. This updated directory state information is written back to the Directory Storage Array 630 in the addressed MCL over Lines 570 as controlled by signals on Control Line 560.

In another instance, a POD may initiate a Fetch operation for a cache line that the MSU does not own, but this is resident in a shared access state in one or more other caches. In this case, the MSU has the most recent copy of the data since data held under shared access may not be modified. The MSU may therefore provide the data to the requesting POD in the manner discussed above. In addition, if the Fetch operation requested exclusive access status, a Purge function must be issued to the POD(s) having the shared local copies, thereby causing these POD(s) to invalidate their local copy.

In addition to controlling transfers of cache line data, the MCA 550 also controls the POD-to-POD transfers of message data. Within the MCA, message routing information is passed from the POD Address Control Block 1010 to the Message Control 1080 on the respective one of Lines 1090 (shown as Lines 1090A, 1090B, 1090C, and 1090D) where this routing information is stored in an FIFO queue structure (not shown). The routing information for the message at the front of the FIFO is made available to the Data Control 1040 on control lines shown collectively as Line 1095. Since data transfers between a POD and memory, or between one POD and another POD, take priority over message transfers, the Data Control 1040 will not generate the control signals necessary to perform the message transfer until any pending data transfers that compete for use of the same interface on Line 750 are completed. When Data Control 1040 does select the message for transfer, Data Control generates control signals on Line 560 which are driven to the MDA 530. The control signals enable the transfer of message data from one of the Write Data Queues 830 of a first (sending) POD Data Block 710 to the input Data Select Logic 870 of another (receiving) POD Data Block on the appropriate interface represented by one of Lines 750. This message data is then routed to the associated POD 120 on Data Lines 510. The Data Control 1040 also generates control signals on Line 1060 to the POD Address Control Blocks 1010 associated with both the POD sending, and the POD receiving, the message data. This causes a respective one of the POD Address Control Blocks to send a response to the sending POD indicating that the message data has been transferred, and further causes a different respective one of the POD Address Control Blocks to send a response to the receiving POD indicating that message data is available. The message passing facility of Platform 100 is discussed in detail in the Co-Pending Application Ser. No. 08/964,606 entitled "Message Flow Protocol for Avoiding Deadlocks," incorporated herein by reference in its entirety. Up to two (2) messages may be routed simultaneously within the MDA 530, and message routing may occur in parallel with receiving data from, and/or transferring data to, ones of the PODs, and receiving data from, and/or transferring data to, ones of the MCLs 535.

POD Address Control

Figure 8:
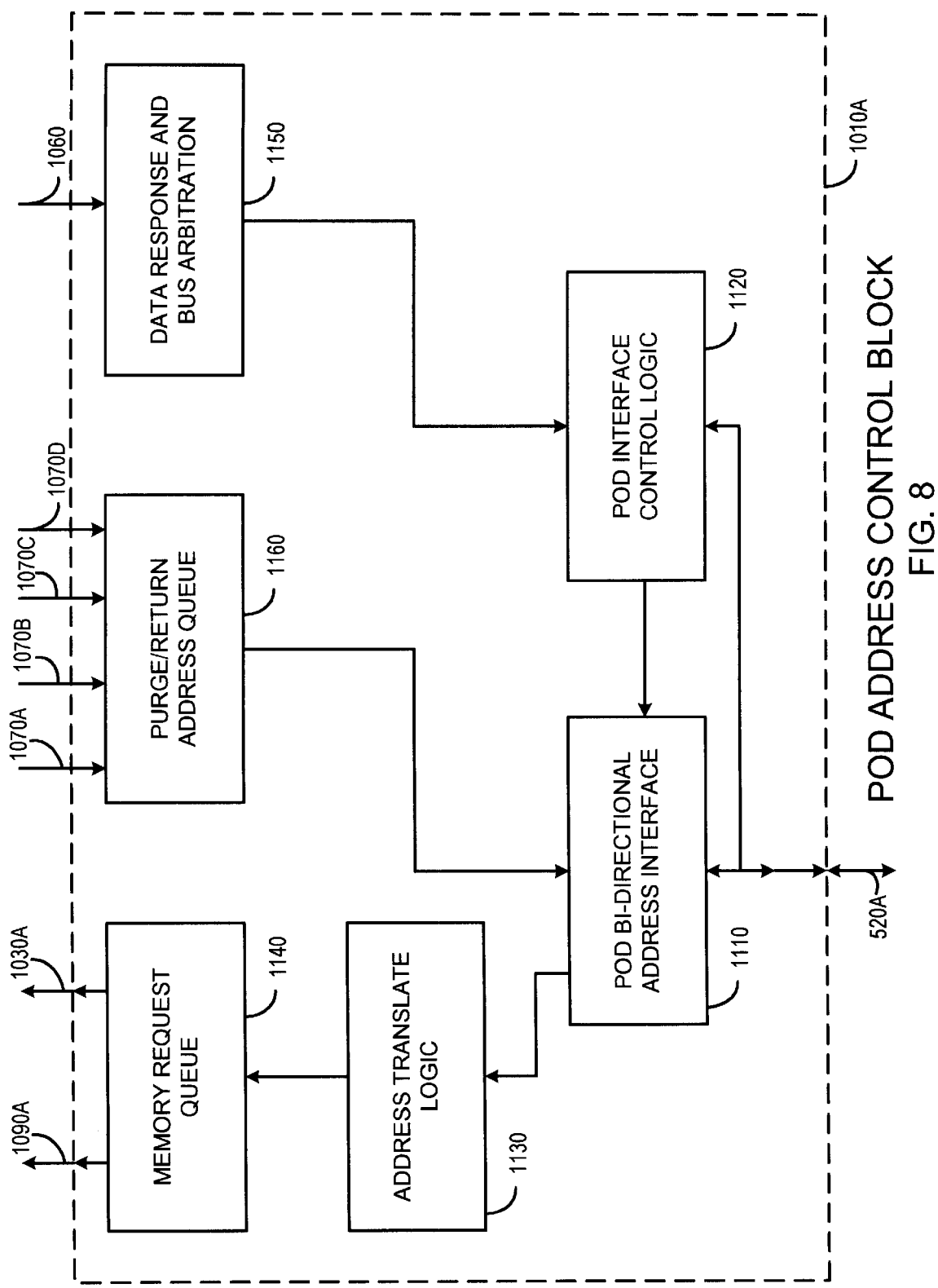
FIG.8 is a block diagram of the POD Address Control Block.

FIG. 8 is a block diagram of the POD Address Control Block. Address Control Block 1010A is shown and described, but it is understood that this discussion applies equally to all POD Address Control Blocks 1010. The POD Bi-directional Address Interface 1110 interfaces with the POD 120A over bi-directional interface shown as Address/command Line 520A. This bi-directional interface is used to send and receive addresses and related control information to/from POD 120A as described above.

POD Bi-directional Address Interface 1110 is controlled by a distributed state machine that is located in both the POD Interface Control Logic 1120 and in POD 120A. This distributed state machine determines the direction of the bi-directional interface shown on Address/command Line 520A. To obtain optimal system performance, the bi-directional interface on Address/command Line 520A is normally driven by POD 120A even when the interface is idle. As a result, no time is wasted when the POD initiates an address transfer from the POD to the MSU 110 during a Fetch, Flush, I/O Overwrite, or Message Operation.

When an address is received from POD 120A on Address/command Line 520A during one of these operations, the address is stored in staging registers in POD Bi-directional Address Interface 1110. The address is then provided to the Address Translate Logic 1130, which performs a translation function on the address based on an address translation pattern stored in a general register array. This translation function re-maps certain addresses provided by the POD 120A to different areas of real memory to allow for memory bank interleaving, expanded memory capacity, and memory sharing capabilities.

After translation, the address is stored in Memory Request Queue 1140 prior to being transferred to a selected one of the Memory Cluster Control Blocks 1020 on Line 1030A. Memory Request Queue 1140 can store up to sixteen (16) addresses. The Memory Request Queue 1140 selects the next address for transfer to a Memory Cluster Control Block 1020 based on the type of operation being performed, the order in which the address was placed in the queue, and on whether or not the Memory Cluster Control Block 1020 associated with the addressed one of the Memory Clusters 535 is available to receive another request address. For Fetch or Flush operations, the selected address is removed from the Memory Request Queue and routed to one of the Memory Cluster Control Blocks 1020 as determined by the address. For Message operations, the current request address is routed via Line 1090A to the Message Control 1080 to be queued as discussed above. An address can be delivered to a Memory Cluster Control Block 1020 every two clock cycles, or every twenty (20) nanoseconds.

As discussed above, an address can also be provided to the POD Address Control Block 1010A from each of the Memory Cluster Control Blocks 1020A, 1020B, 1020C, and 1020D on Lines 1070A, 1070B, 1070C, and 1070D, respectively, during Return or Purge Operations. Return Operations are initiated when a POD requests access to a cache line that is indicated by the associated directory state information as already being exclusively owned by a cache entity within another POD. The address of the cache line is therefore provided to the POD currently owning the data so that the data can be returned to the MSU 110.

For example, assume one of PODs 120B, 120C, or 120D provides a Fetch address to the MCA which is ultimately transferred to the Memory Cluster Control Block 1020 associated with the addressed cache line. After the cache line is read from the addressed MCL 535, it is determined that Pod 120A has exclusive ownership of the requested cache line. In response, one of the Memory Cluster Control Blocks 1020 provides the address over the associated one of Lines 1070 to Purge/Return Address Queue 1160. Purge/Return Address Queue selects one of queued addresses using a rotational priority selection scheme for presentation to the POD Bi-directional Address Interface 1110. In addition, Data Control 1040 provides control information via Line 1060 to Data Response and Bus Arbitration Logic 1150 within the POD Address Control Block 1010 associated with the POD currently owning the data. Data Response and Bus Arbitration Logic 1150 interfaces with, and provides control information to, POD Interface Control Logic 1120. POD Interface Control Logic determines, according to a predetermined priority scheme, when the MSU may drive Address/command Line 520 with the cache line address and the Return function. Once the bi-directional Address/command Line 520A may be driven by POD Bi-directional Address Interface 1110, the distributed state machine within the POD Interface Control Logic 1120 and POD 120A controls the presentation of the Return address from POD Bi-directional Address Interface 1110 to POD 120A. The POD 120A then returns data in the manner discussed above.

The same mechanism discussed above is used in association with a Purge function. As discussed above, a Purge function is initiated when a POD requests exclusive ownership of a cache line that is held by one or more PODs as shared owners. In this situation, the most recent copy of the data is held by the MSU 110 because PODs having shared ownership rights are not allowed to modify the data. Therefore, the requesting POD can obtain the cache line(s) from the MSU. However, the shared owners must be notified to invalidate their local copies. One of the Memory Cluster Control Blocks 1020 provides the cache line address and an associated Purge function to one or more of the POD Address Control Blocks 1010 associated with the current shared owner(s). The POD Address Control Block(s) presents the addresses to the POD(s) in the manner described above with respect to Return functions, except that the POD(s) does not return data, but instead designates the local copies of the cache line as invalid.

Figure 9:
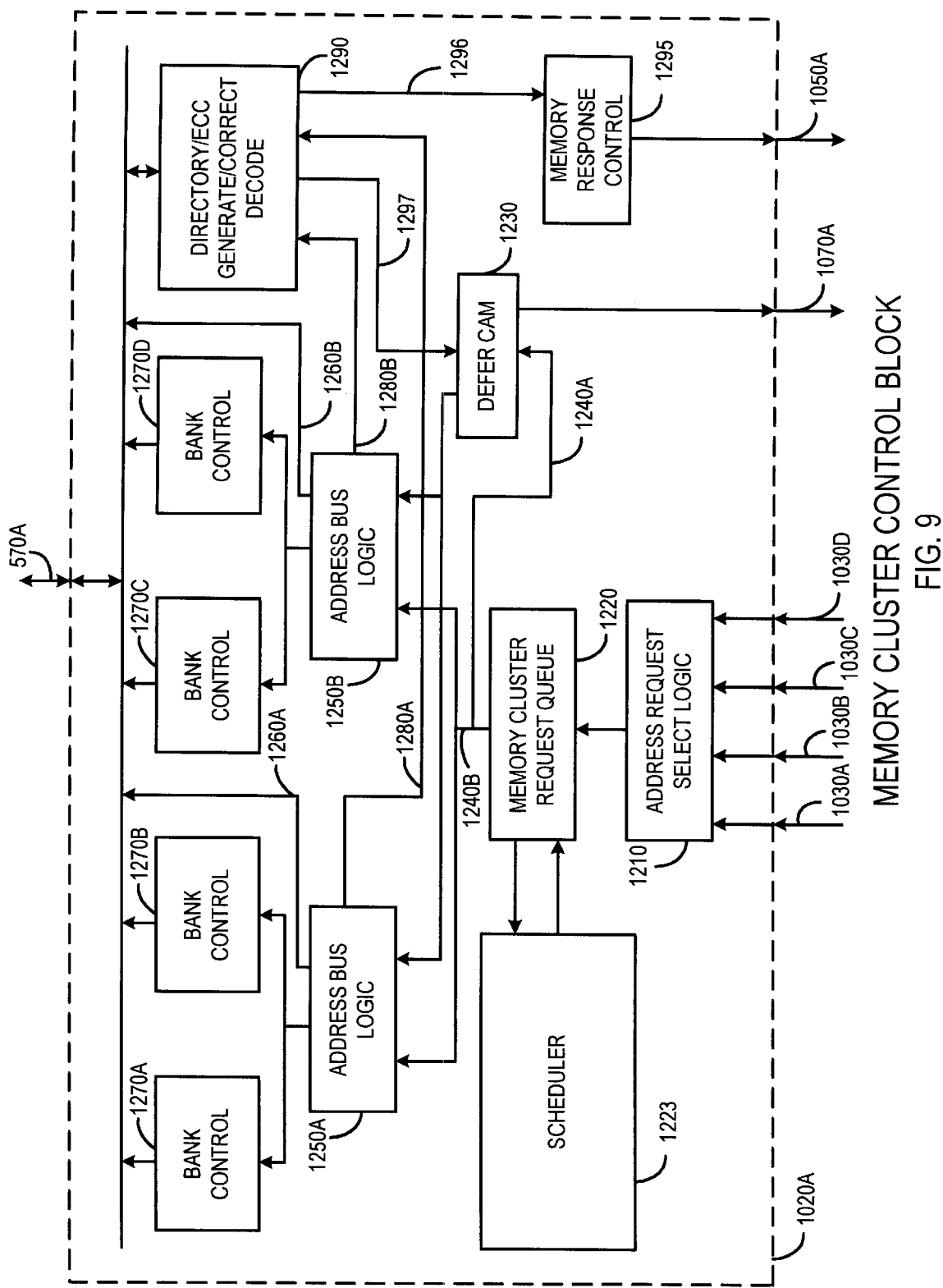
FIG. 9 is a block diagram of Memory Cluster Control Block.

FIG. 9 is a block diagram of Memory Cluster Control Block 1020A. Although Memory Cluster Control Block 1020A is shown and described, the discussion applies equally to all Memory Cluster Control Blocks. Memory Cluster Control Block 1020A receives addresses from each of POD Address Control Blocks 1010A, 1010B, 1010C, and 1010D on 128-bit interfaces represented as Lines 1030A, 1030B, 1030C, and 1030D, respectively. These addresses are provided to Address Request Select Logic 1210. Since each of these interfaces operates independently, four (4) addresses may be pending at the Address Request Select Logic 1210 at once.

As discussed above, when a POD Address Control Block 1010 provides an address on a respective one of Lines 1030, the address is driven to all Memory Cluster Control Blocks 1020 within the MCA 550. However, in a fully populated MSU 110, each of the Memory Cluster Control Blocks 1020 handles only one-fourth of the address range of the MSU. The Address Request Select Logic 1210 provides the filtering function which selects addresses from the appropriate one-fourth of the address range for presentation to the Memory Cluster Request Queue 1220, where the address is stored.

A scheduler 1223 is coupled to the Memory Cluster Request Queue 1220. The scheduler 1223 selects a request from the Memory Cluster Request Queue 1220 and schedules the selected request for presentation to the MCL 535. The selection is preferably not made based on a purely first-in, first-out basis, but is made to maximize the number of requests that can be processed within an MCL. As discussed above, the MCL allows up to four requests to be interleaved simultaneously, one to each of the available MSU Expansions 610. The simultaneous processing or interleaving of requests is discussed in more detail below.

After the Memory Cluster Request Queue 1220 selects an address as the next request address to be presented to the MCL 535, the address is passed to Defer Cam 1230 on Line 1240A. Defer Cam 1230 stores every address within the respective one of the MCLs 535 that is associated with an in-progress MSU operation including a Fetch, Flush, Return, or I/O Overwrite. If the current address presented on Line 1240A addresses the same cache line as one of the addresses already stored within the Defer Cam 1230, a new entry is made in the Defer Cam, but the current address is not presented to an MCL immediately. The current address will not be handled; that is, the request will be deferred, until the in-progress operation associated with that address has been completed and the older conflicting address is removed from the Defer Cam.

Before continuing with the current example, a review of the logic of the MCL is provided for discussion purposes. As shown in FIG. 3 and discussed above, an MCL 535 may contain up to four MSU Expansions 610. If the MCL is fully populated, each of the MSU Expansions maps to one-fourth of the address range of the MCL. Within the MCL, two MSU Expansions share one of the Address Buses 640. MSU Expansions 610A and 610C share Address Bus 640A, and MSU Expansions 610B and 610D share Address Bus 640B. Each of these Address Buses 640 are driven by a respective one of the Address Bus Logic 1250A and 1250B of the Memory Cluster Control Block 1020A. For example, Address Bus logic 1250A drives Address Bus 640A via Line 1260A. Similarly, Address Bus Logic 1250B drives Address Bus 640B via Lines 1260B. Each of the Bank Control 1270A, 1270B, 1270C, and 1270D provide the control signals that enable one of the MSU Expansions 610A, 610B, 610C, and 610D, respectively. The MSU Expansion that is enabled depends on the request address. The control signals provided by Bank Control 1270, and the address signals on Lines 1260A and 1260B are shown collectively as Address Lines 570A.

Returning now to the current example, if the current address does not conflict with an address stored within the Defer Cam 1230, it is provided on Line 1240B to one of the Address Bus Logic 1250A and 1250B. Only one of Address Bus Logic 1250A and 1250B is enabled to receive the address based on which one of the MSU Expansions 610 is mapped to the address within the MCL 535. The request address is driven onto Lines 1260 for presentation to the appropriate one of the MSU Expansions 610 via the associated one of the Address Buses 640. The Bank Control associated with the MSU Expansion 610 provides the control signals that enable the selected MSU Expansion to receive the address.

In addition, the Address Bus Logic 1250 provides control signals on the respective one of Lines 1280A or 1280B to Directory ECC Generate/Correct Decode 1290. These control signals enable Directory ECC Generate/Correct Decode 1290 to receive the nine bits of directory state information from the Directory Storage Array 630 stored within the addressed MSU Expansion 610 via the Directory Data Bus 650. The Directory ECC Generate/Correct Decode 1290 further receives ECC bits, which provides single-bit error correction and double-bit error detection on the directory state information. The Directory ECC Generate/Correct Decode 1290 corrects and/or detects errors associated with the directory state information, then modifies the information to reflect new access status, and finally re-writes the information back to the addressed Directory Storage Array 630. Directory ECC Generate/Correct Decode also provides control signals to Memory Responses Control 1295 via Line 1296. In turn, Memory Response Control 1295 may generate signals on Line 1050A to Data Control 1040 of the MCA, which will result in a Response being issued to the requesting POD 120. For example, if a Fetch is occurring and the directory state information indicated the MSU owns the data, Memory Response Control 1295 generates signals on Line 1050A to ultimately cause a Response to be provided with the data to the POD. However, if the directory state information indicates another POD exclusively owns the data, Memory Response Control 1295 does not generate signals on Line 1050A until the previous owner returns the data, which may then be provided to the requesting POD.

In addition to providing control signals to Memory Response Control 1295, Directory ECC Generate/Correct Decode also provides control signals to the Defer Cam 1230 to signal when an address should be removed from the Defer Cam. For example, during a Fetch Operation in which the directory state information indicates the MSU owns the data, or wherein one or more PODs have shared access to the data, the Directory ECC Generate/Correct Decode generates control signals to the Defer Cam via Line 1297 shortly after the MSU Expansion provides the requested data. This is because the operation is considered completed, and the associated address is therefore removed from the Defer Cam, and the data is returned to the requesting POD. However, following a Fetch Operation involving data exclusively owned by another POD, the Directory ECC Generate/Correct Decode does not generate the control signals to the Defer Cam until the Return Operation is completed, since until this time, the operation is still considered to be in-progress, and no further operations may be initiated to the same cache line. Interlacing of Memory Requests within the MCLs.

As indicated above with reference to FIG. 2, the illustrative embodiment provides a discrepancy between the faster transfer rate of the Data Buses 540 and the slower access rate to the MCLs 535. That is, in the illustrative embodiment, MCLs 535 require 20 clock cycles, or 200 ns, to complete a memory operation involving a cache line of data. In contrast, each of the Data Buses 540 are capable of transferring a 64-byte cache line of data to/from each of the MCLs 535 in five (5) bus cycles, wherein each bus cycle corresponds to one clock cycle. This 5-cycle transfer includes one bus cycle for each of the four (4) 16-byte data transfer operations associated with a 64-byte cache line, plus an additional bus cycle to switch drivers on the bus. To resolve the discrepancy between the faster transfer rate of the Data Buses 540 and the slower access rate to the MCLs 535, the illustrative system is designed to allow four (4) interlaced memory requests in varying phases of completion to a single MCL 535.

To allow the request interlacing, each set of Address Lines 570 includes two address buses and independent control lines. As discussed above with reference to FIG. 3, each of the Address Lines 570A includes two Address Buses 640 (shown as 640A and 640B in FIG. 3), one for each pair of MSU Expansions 610. In the example shown in FIG. 3, Data Storage Arrays 620A and 620C receive Address Bus 640A, and Data Storage Arrays 620B and 620D receive Address Bus 640B. This dual address bus structure allows multiple memory transfer operations to be occurring simultaneously to each of the Data Storage Arrays within an MCL 535, thereby allowing the slower memory access rates to more closely match the data transfer rates achieved on Data Buses 540.

The Data Storage Arrays within the MSU Expansions are preferably off-the-shelf type SDRAM's. The specific timing and drive requirements for these devices are generated with the MSU Expansion from signals provided by Address Bus Logic 1250. The preferred MSU Expansions require three (3) clock cycles of Row Address Strobe (RAS), followed by two (2) clock cycles of Column Address Strobe (CAS). Following these five (5) clock cycles, five (5) dead clock cycles are required. Finally, another five (5) clock cycles of Column Address Strobe (CAS) must be provided. For a read operation, read data is captured by MDA 530 during the first four (4) clock cycles of the second assertion of the Column Address Strobe (CAS), as shown in FIG. 10. For a write operation, the write data is provided to the addressed MSU Expansion during the first four (4) clock cycles of the five (5) dead clock cycles discussed above, as shown in FIG. 11.

Figure 12:
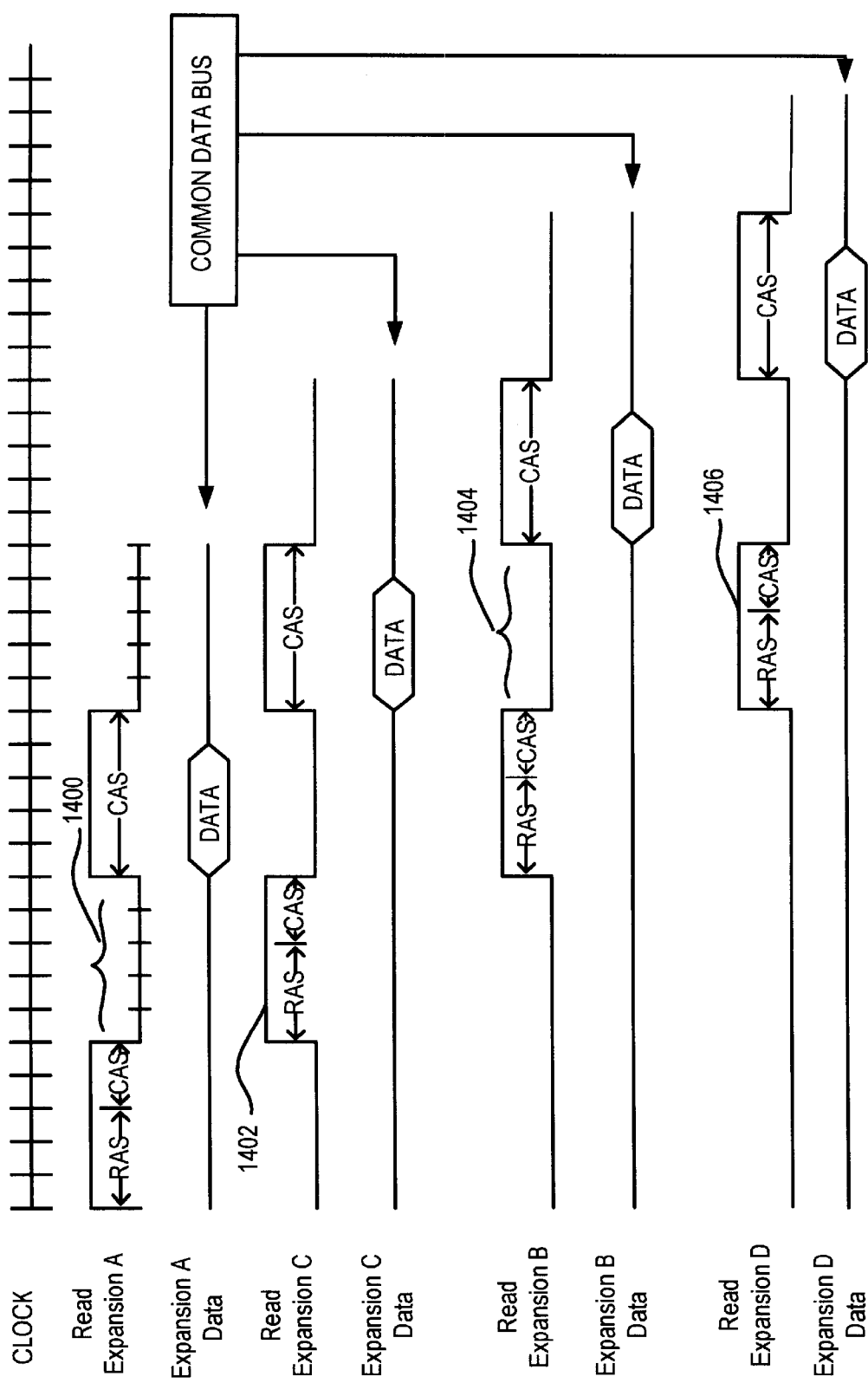
FIG. 12 is a timing diagram showing interleaved read requests to two MSU Expansions.
Figure 13:
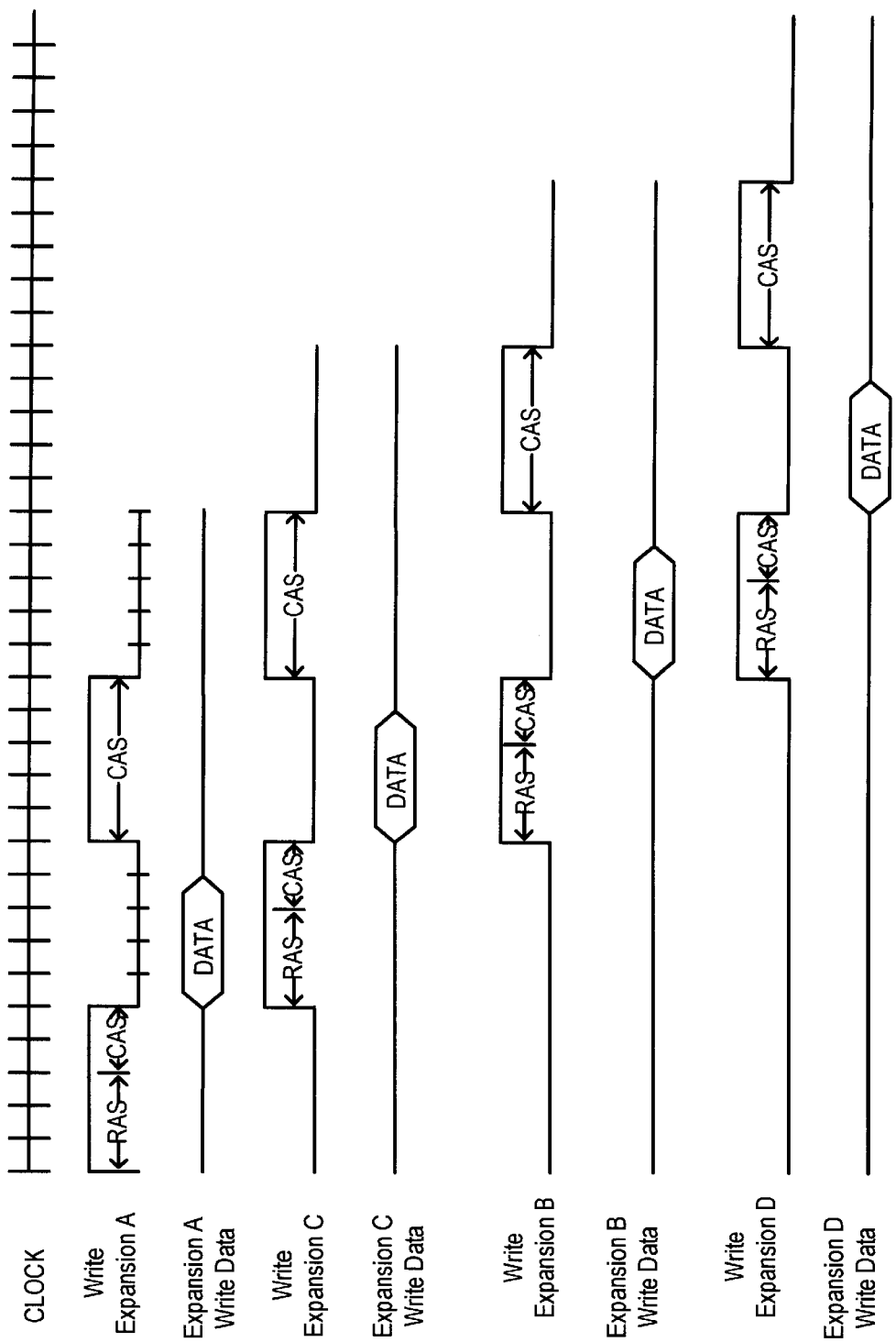
FIG. 13 is a timing diagram showing interleaved write requests to two MSU Expansions.

To maximize the utilization of the shared address bus 640A, which is shared between for example MSU Expansion 610A and 610C, the five (5) dead cycles between the first and second assertion of the Column Address Strobe (CAS) are used to start another similar request. As shown in FIG. 12, the RAS and the first assertion of the CAS 1402 for reading MSU Expansion 610C overlaps the five (5) dead cycles 1400 between the first and second assertion of the Column Address Strobe (CAS) for reading the MSU Expansion 610A. Likewise, for shared address bus 640B, the RAS and the first assertion of the CAS 1406 for reading the MSU Expansion 610D overlaps the five (5) dead cycles 1404 between the first and second assertion of the Column Address Strobe (CAS) of the previous read operation of the MSU Expansion 610B. This illustrates how the read type requests may be interleaved to increase the performance of the system without overlapping read data. Write type requests may be interleaved in a like manner, as shown in FIG. 13.

Figure 14:
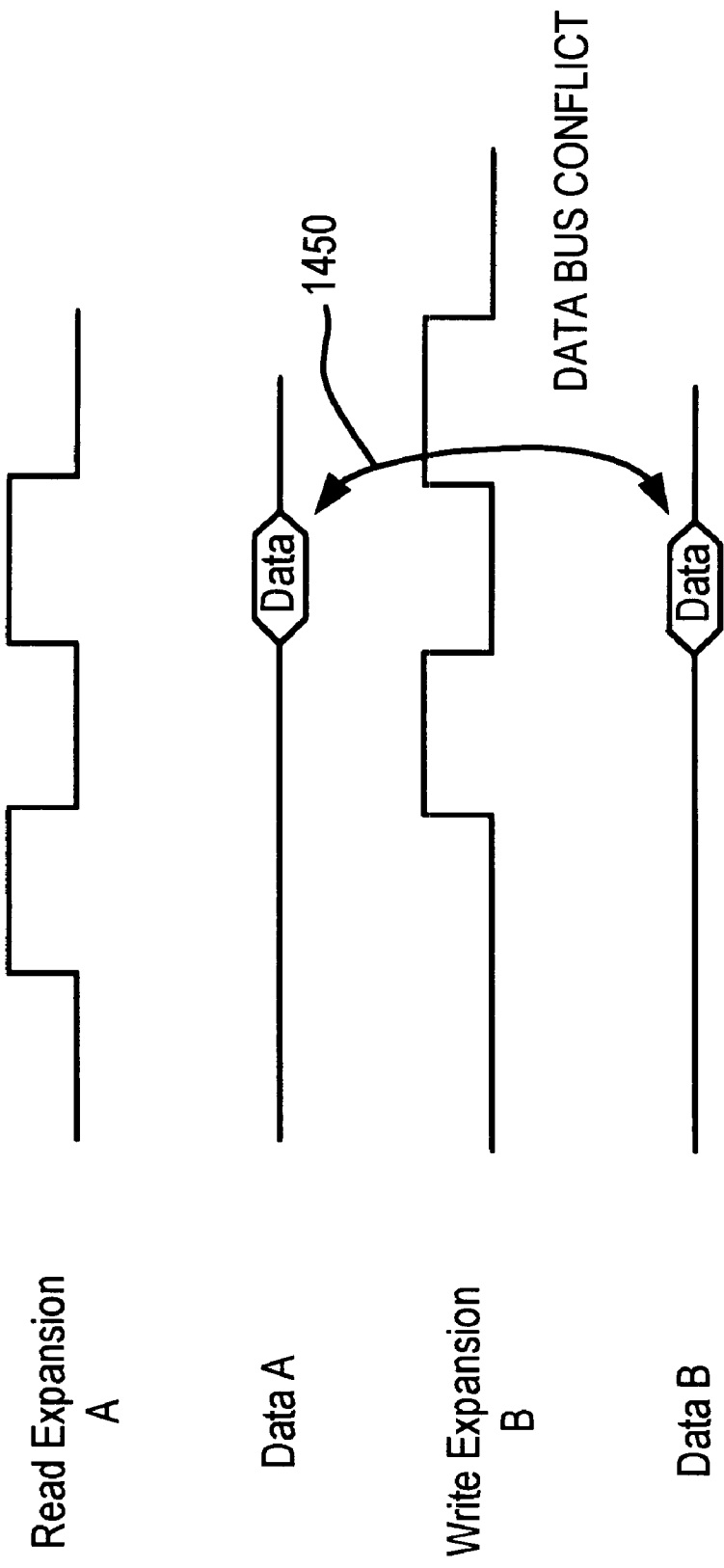
FIG. 14 is a timing diagram showing an interleaved read request and write request, with the resulting data bus conflict.
Figure 15:
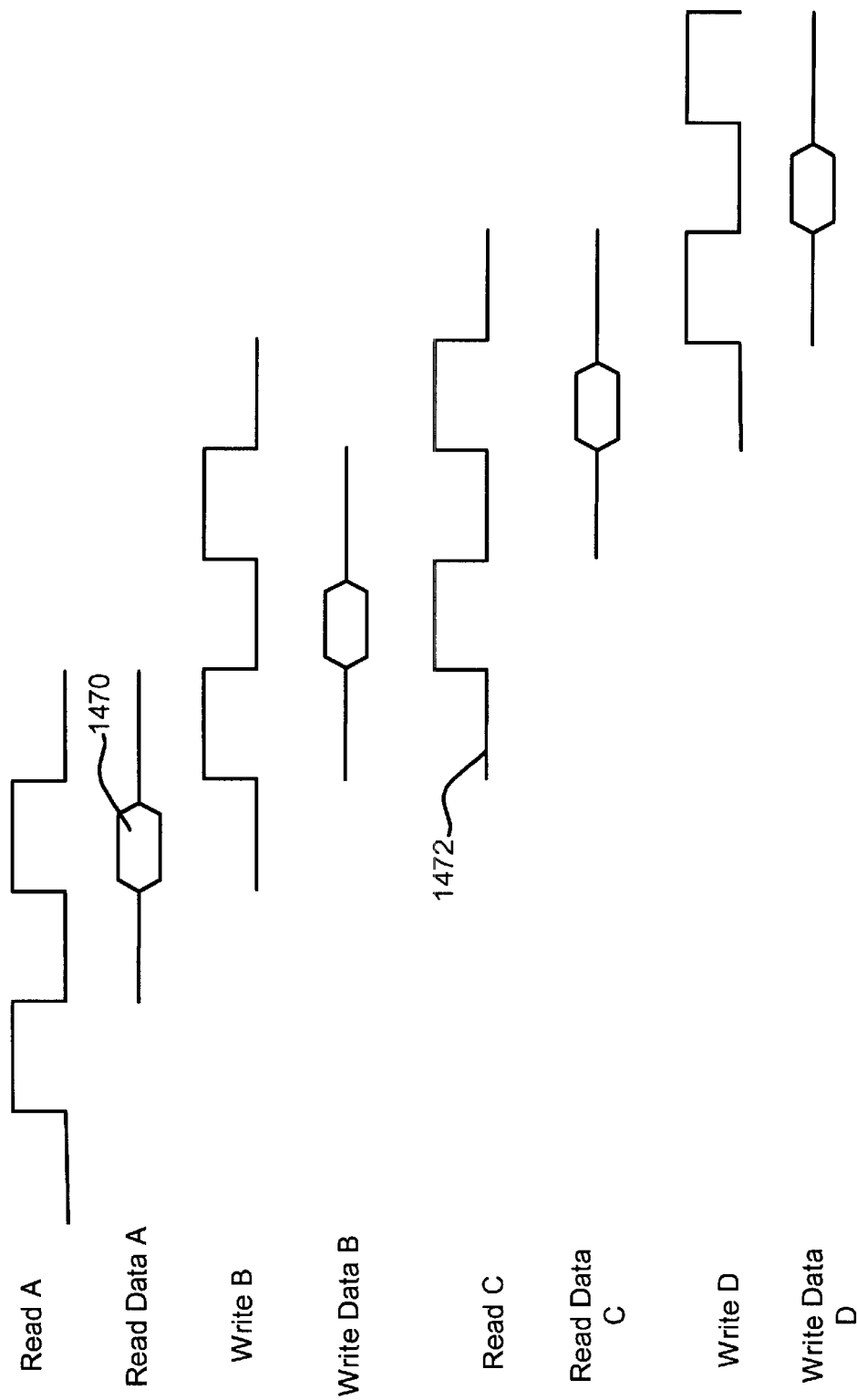
FIG. 15 is a timing diagram showing properly interleaved read and write requests without any data bus conflicts.

In the illustrative data processing system, the write requests cannot be interleaved with the read requests in the same manner as the read and write requests can be interleaved with each other. For example, if the first assertion of the Address (RAS,CAS) of a write request is interleaved with a read request, as shown in FIG. 14, the write data would conflict with the read data on the common Data Buses 540, as shown at 1450. Because of this, a write request that follows a read request must be delayed to the position shown in FIG. 15. That is, the first assertion of the Address (RAS,CAS) of the write request must be delayed until after the read request provides the read data 1470 on Data Buses 540. Likewise, the first assertion of the Address (RAS,CAS) of a read request that follows a write request, such as read request 1472, must be delayed to overlap the five (5) dead cycles of the previous write request, as shown in FIG. 15. These delays can reduce the band pass of the MSU by up to 50% relative to the band pass that can be achieve when executing only read requests or only write requests.

According to an illustrative embodiment of the present invention, a method and apparatus are provided for scheduling the execution of selected requests that are received in a first-in-time sequence such that two or more request types are executed in a particular predetermined sequence. This is preferably achieved by identifying two (2) or more requests that have two (2) or more predetermined request types, and scheduling the identified requests in an order that corresponds to the particular sequence.

Figure 16:
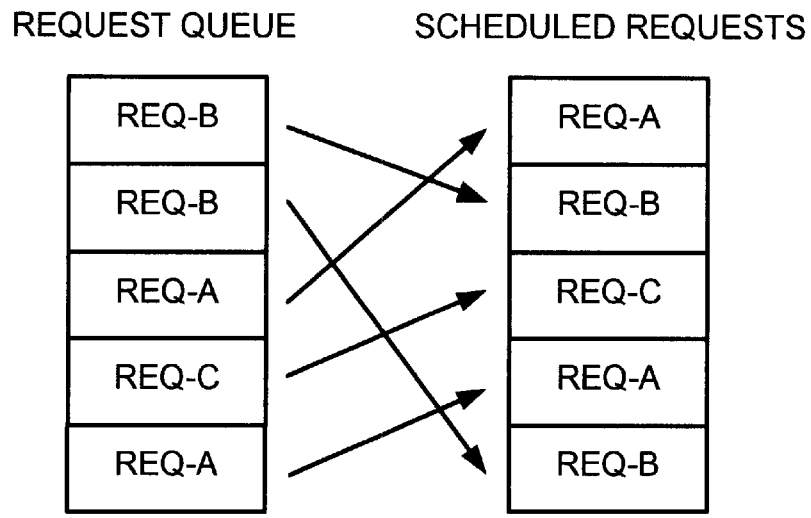
FIG. 16 is a schematic diagram showing a first scheduling approach for re-ordering selected requests into a predetermined sequence.

FIG. 16 is a schematic diagram showing a first scheduling approach for re-ordering selected requests into a predetermined sequence. A data processing system, or the like, issues a number of requests in a first-in-time sequence and stores the requests in a request queue such as Memory Cluster Request Queue 1220 of FIG. 9. Five (5) illustrative requests are shown in the left hand column of FIG. 16, where the first-in-time sequence of the requests is REQ-B, REQ-B, REQ-A, REQ-C, and REQ-A.

It is assumed that the illustrative data processing system may processes a particular sequence of requests faster than another sequence of the requests. In the illustrative diagram, it is assumed that the data processing system can process the request sequence REQ-A, REQ-B, REQ-C faster than another sequence of these requests. Thus a scheduler, such as scheduler 1223 of FIG. 9, may schedule the requests for execution in the predetermined sequence REQ-A, REQ-B, REQ-C whenever possible. This is shown in the right hand column of FIG. 16.

It is contemplated that the scheduler may schedule the requests using any number of approaches. For example, the scheduler may take a snap-shot of the requests that are in the request queue at a given instant in time and schedule those requests in accordance with the predetermined request sequence. Alternatively, the scheduler may examine the requests in the request queue after each request or set of requests are scheduled to identify if any requests have been added to the request queue. The request that are added to the request queue may increase the likelihood that the predetermined request sequence can be continued. In any case, the scheduler preferably attempts to schedule the requests that are in the request queue in accordance with a predetermined request sequence, whenever possible.

Figure 17:
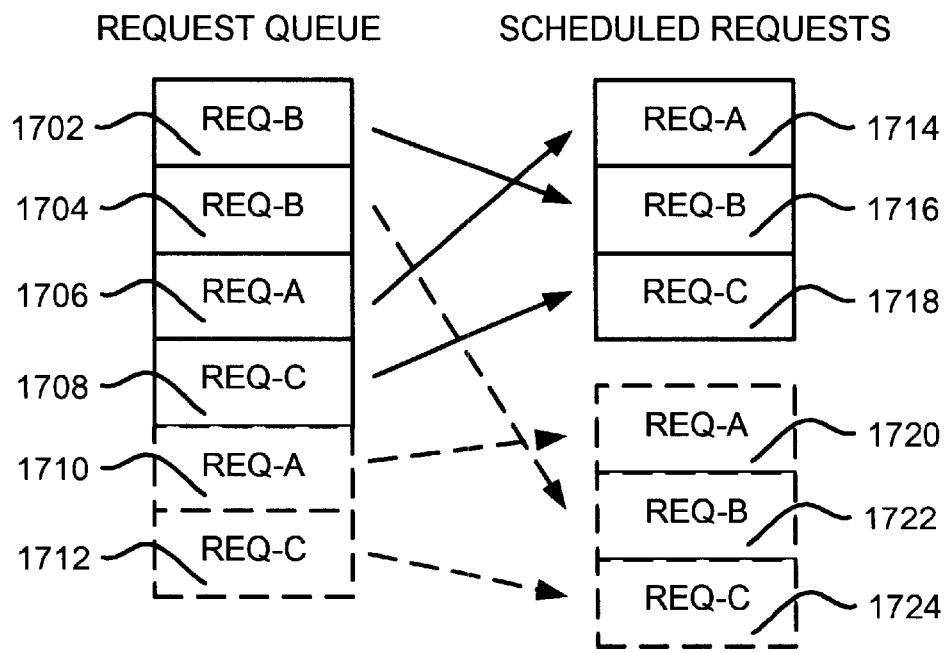
FIG. 17 is a schematic diagram showing another scheduling approach for re-ordering selected requests into a predetermined sequence, wherein some of the requests are issued after selected requests are scheduled and/or executed.

FIG. 17 is a schematic diagram showing another scheduling approach for re-ordering selected requests into a predetermined sequence, wherein some of the requests are issued after selected requests are scheduled and/or executed. At a first moment in time, the request queue includes REQ-B 1702, REQ-B 1704, REQ-A 1706, and REQ-C 1708. Thus, at the first moment in time, the scheduler schedules REQ-A 1706, REQ-B 1702, and REQ-C 1708, as shown at 1714, 1716 and 1718. During or after these requests are scheduled and/or executed, additional requests may be provided to the request queue. In the illustrative diagram, requests REQ-A 1710 and REQ-C 1712 are added to the request queue, as indicated by the dotted lines. Thus, when scheduling additional requests for execution, the scheduler may now use REQ-A 1710 and REQ-C 1712 to continue the predetermined sequence of requests. In the example shown, the scheduler schedules REQ-A 1710, REQ-B 1704, and REQ-C 1712, as shown at 1720, 1722, and 1724, to continue the predetermined sequence of requests.

It is contemplated that a selected number of first requests of a first request type may be identified by examining the requests stored in the Memory Cluster Request Queue 1220 (see FIG. 9). The identified first requests may then be scheduled for execution, and executed. The identified first requests may be scheduled and executed, regardless of whether additional requests are provided to the Memory Cluster Request Queue 1220 after scheduling and/or execution of the first requests is initiated. After the first requests are scheduled and/or executed, a selected number of second requests of the second request type are identified by examining the requests stored in the Memory Cluster Request Queue 1220. The identified second requests are then scheduled for execution, and executed. The request are identified as being of the first request type or the second request type by examining a number of function codes associated with each request.

It is contemplated that the execution of the first requests may be initiated before or after the selected number of second requests are completely scheduled and/or executed. Likewise, the execution of the selected number of first requests may be initiated before or after the selected number of first requests are completely scheduled and/or executed.

Figure 18:
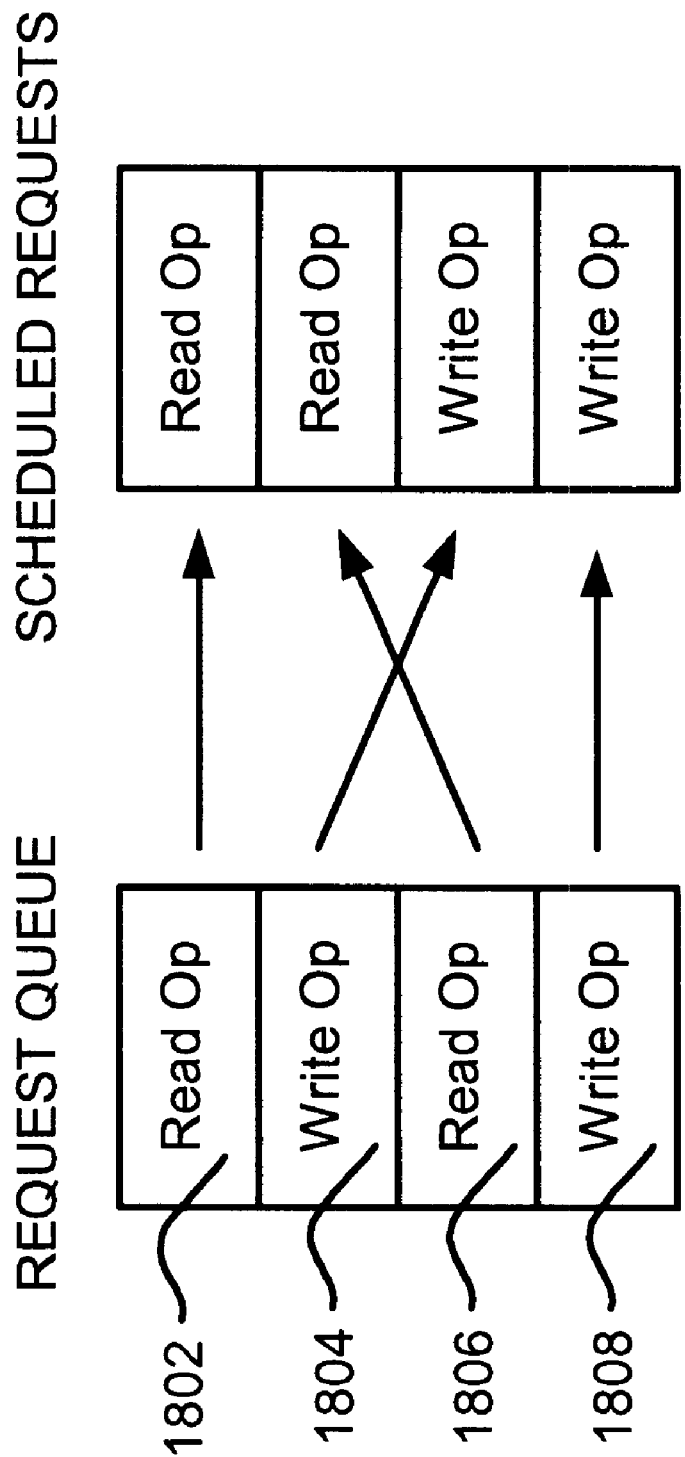
FIG. 18 is a schematic diagram showing a scheduling approach for re-ordering read and write requests into a predetermined sequence.

FIG. 18 is a schematic diagram showing a scheduling approach for re-ordering read and write requests into a predetermined sequence. As indicated above with respect to FIGS. 10–15, the illustrative data processing system of FIGS. 1–9 cannot interleave write requests and read requests in the same manner as read and write requests can be interleaved with each other. That is, back-to-back execution of two (2) read requests followed by the back-to-back execution of two write requests is faster than the execution of a read, a write, a read, and finally a write request. Stated more generally, it may be more efficient to execute a number of requests of a first request type followed by a number of requests of another request type.

Referring specifically to FIG. 18, a number of requests are stored in a request queue, such as Memory Cluster Request Queue 1220 of FIG. 9. Four (4) illustrative requests are shown in the left hand column of FIG. 18 including a Read-Op request 1802, a Write-Op request 1804, a Read-Op request 1806, and a Write-Op request 1808. To processes these requests more efficiently, the illustrative embodiment schedules the back-to-back execution of the two (2) Read-Op requests 1802 and 1806 followed by back-to-back execution of the two (2) Write-Op requests 1804 and 1808.

Figure 19:
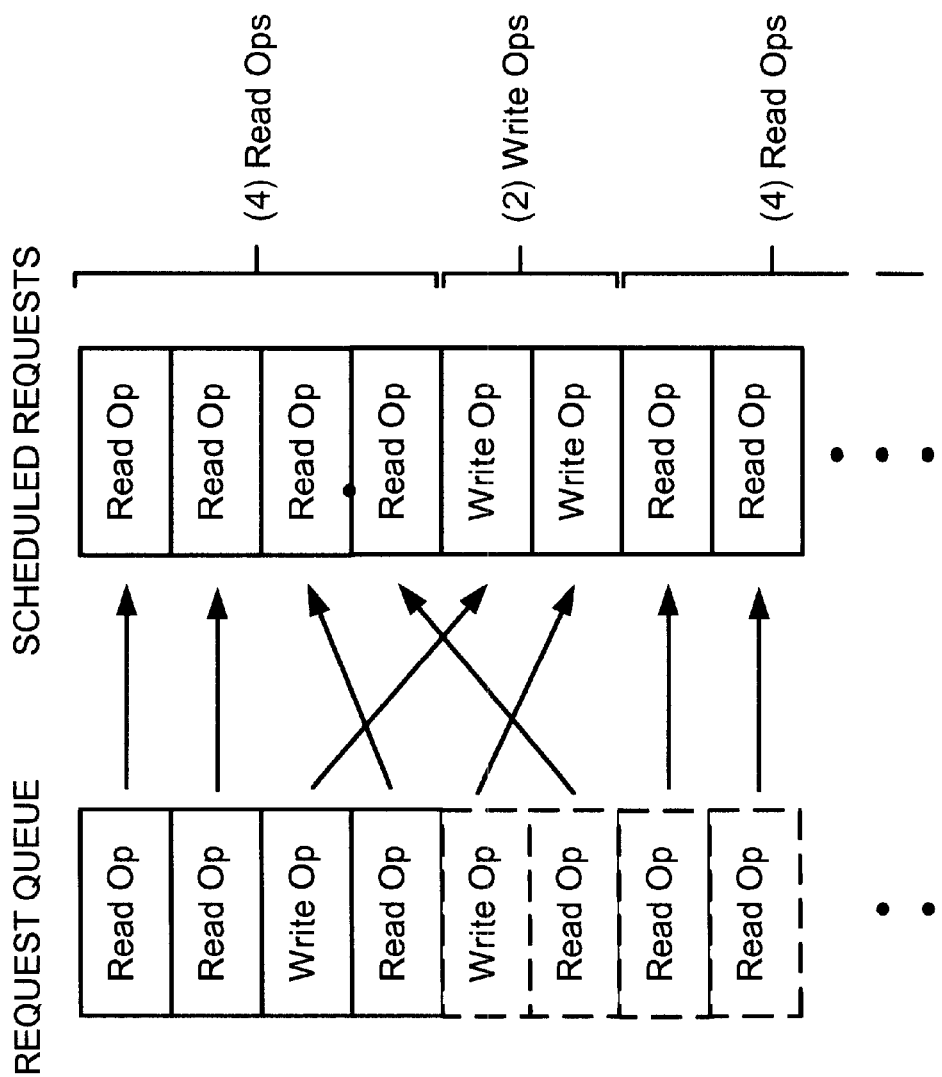
FIG. 19 is a schematic diagram showing a scheduling approach for re-ordering read and write requests into a predetermined sequence, wherein some of the requests are issued after selected requests are scheduled and/or executed.

It is contemplated that more than just two (2) read request may be scheduled for back-to-back execution. FIG. 19 shows back-to-back execution of four (4) Read-Op requests followed by two (2) Write-Op requests. The number of Read-Op requests and Write-Op requests may be selected to match the expected mix of read and write type requests provided by the data processing system.

Figure 20:
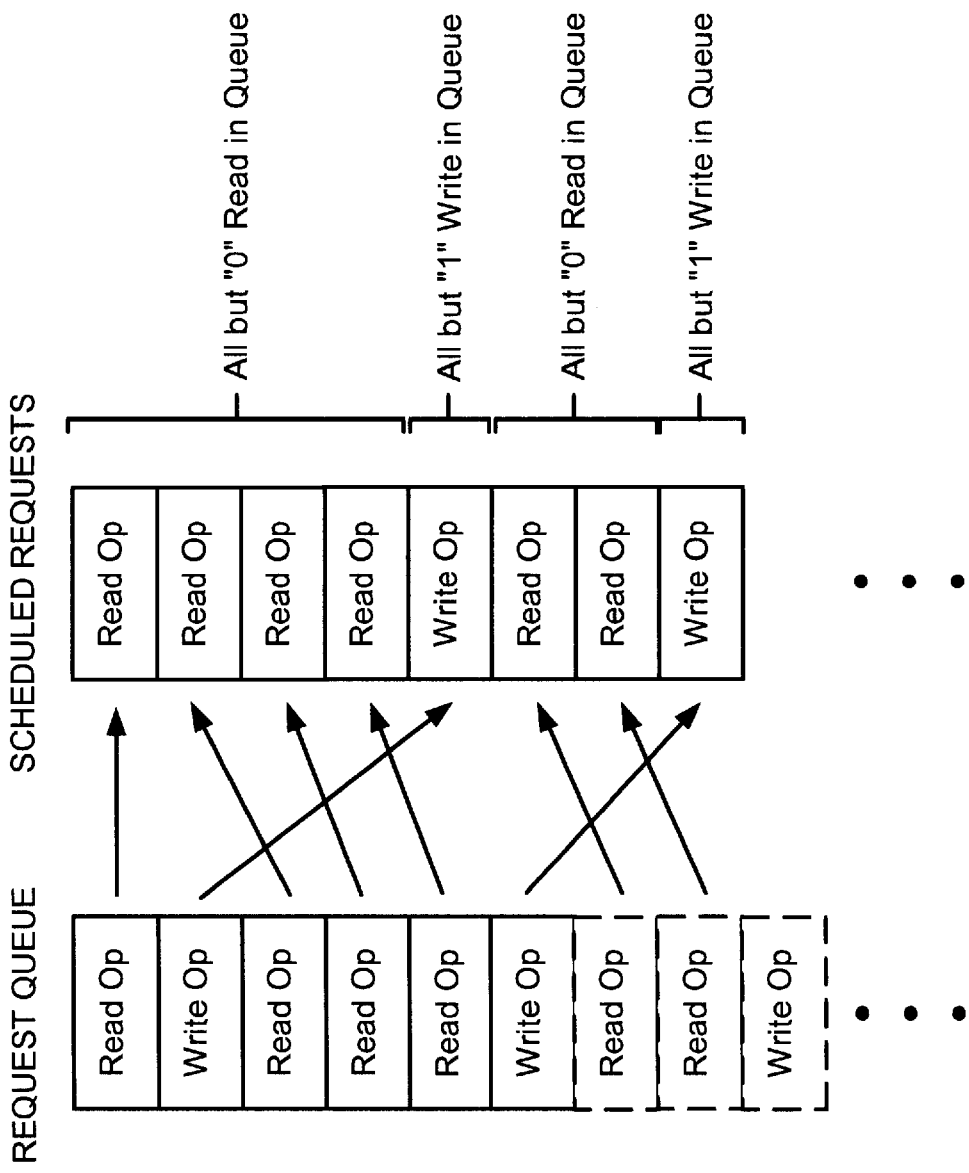
FIG. 20 is a schematic diagram showing another scheduling approach for re-ordering read and write requests into a predetermined sequence.

As shown in FIG. 20, it is contemplated that all but "n" Read-Op requests may be scheduled for execution before other Write-Op requests are scheduled, where "n" is greater than or equal to zero. Likewise, all but "m" Write-Op requests may be scheduled for execution before any additional Read-Op requests are scheduled, where "m" is greater than or equal to zero. This may maximize the number of requests of each request type that are executed in succession, and thus minimize the number of transitions that occur between request types.

Finally, it is contemplated that the scheduler may take a snap-shot of the request queue before scheduling each of the requests, or may examine the number of requests in the request queue periodically and preferably after each request is scheduled. In any case, the scheduler may schedule a number of requests of a first request type followed by a number of requests of a second request type, wherein the number first and second request types is dependent on the number of requests in the request queue.

In all of the above-embodiments, it is recognized that to maintain data coherency, it may be desirable to ensure that all requests of a particular request type are executed in first-in-time sequence relative to all other requests of the same request type. That is, it may be desirable to executed all read type requests in a first-in-time sequence relative to all other read type requests, and/or all write type requests in a first-in-time sequence relative to all other write type requests. This is particularly true for those requests that access the same memory location within a memory.

Having thus described the preferred embodiments of the present invention, those of skill in the art will readily appreciate that the teachings found herein may be applied to yet other embodiments within the scope of the claims hereto attached.

What is claimed is:

1. A method for scheduling and executing a number of first requests having a first request type and a number of second requests having a second request type that are stored in a queue of a data processing system, the data processing system configured such that execution of two requests of the first request type or two requests of the second request type is faster than the execution of a request of the first request type followed by a request of the second request type, the method comprising the steps of:

scheduling a predetermined number of the first requests of the first request type followed by a predetermined number of second requests of the second request type to increase the performance of the data processing system;

executing the selected number of first requests; and executing the selected number of second requests.

2. A method according to claim 1, wherein the execution of the selected number of first requests is initiated before the selected number of second requests are completely scheduled and/or executed.

3. A method according to claim 1, wherein the execution of the selected number of first requests is initiated after the selected number of second requests are completely scheduled.

4. A method according to claim 1, wherein the steps recited therein are repeated.

5. A data processing system for processing a number of requests, the data processing system issuing a number of requests including two or more request types in a first-in-time sequence, the data processing system configured such that execution of two or more predetermined request types is faster when executed in a predetermined sequence, the data processing system comprising:

queuing means for queuing the number of requests;

scheduling means coupled to said queuing means for identifying two or more requests that have the two or more predetermined request types, and for scheduling the two or more requests in an order that corresponds to the predetermined sequence which is different from the first-in-time sequence to increase the performance of the data processing system, said scheduling means further scheduling all requests of a particular request type in the first-in-time sequence; and execution means coupled to said scheduling means for executing the two or more requests in the predetermined sequence.

6. A data processing system according to claim 5, further comprising:

a memory having a number of memory locations;

a first processor for issuing the number of requests to the memory; and a second processor coupled to said memory.

7. A data processing system according to claim 6, wherein the number of requests include read requests and write requests, each of the write requests submits an address and a write data packet to the memory, and each of the read requests submits an address to the memory and receives a read data packet from the memory.

8. A data processing system according to claim 7, wherein the memory has a number of data busses and a number of address busses, wherein the number of address busses is greater than the number of address busses.

9. A data processing system according to claim 8, wherein the predetermined sequence includes two or more read requests followed by one or more write requests.

10. A data processing system according to claim 8, wherein the predetermined sequence includes one or more read requests followed by two or more write requests.

11. A data processing system for processing a number of requests, the data processing system issuing two or more requests including a first request type and a second request type in a first-in-time sequence, the data processing system configured such that execution of a request of the first request type to a request of the second request type is slower than the execution of two requests of the first request type or two requests of the second request type, the data processing system comprising:

queuing means for queuing the two or more requests;

executing means for executing the number of requests;

scheduling means coupled to said queuing means and further coupled to said execution means for taking a snap-shot of the request in the queuing means resulting in a number of current requests, and scheduling back-to-back execution of a number of the current requests of the first request type thereby resulting in a number of first scheduled requests, and for scheduling back-to-back execution of a number of the current requests of the second request type thereby resulting in a number of second scheduled requests; and said execution means executing the first scheduled requests followed by the execution of the second scheduled requests.

12. A data processing system according to claim 11, wherein the execution of the number of first scheduled requests is initiated before the scheduling means is completed in scheduling the number of second scheduled requests.

13. A data processing system according to claim 11, wherein the selected number of first scheduled requests and the selected number of second scheduled requests are dependent on the number of current requests of the first and second request type stored in the queuing means when the snap-shot of the queuing means is taken.

14. A data processing system according to claim 13, wherein the number of first scheduled requests are scheduled and executed until all but "n" of the first requests stored in the queuing means when the snap-shot of the queuing means is taken are executed, where "n" is greater than or equal to zero.

15. A data processing system according to claim 14, wherein the number of second scheduled requests are scheduled and executed until all but "m" of the second requests stored in the queuing means when the snap-shot of the queuing means is taken are executed, where "m" is greater than or equal to zero.

16. A data processing system according to claim 11, wherein said scheduling means ensures that all current requests having the same request type are executed in a first-in-time sequence relative to all other current requests of the same request type.

17. A data processing system for processing a number of requests, the data processing system issuing a number of requests in a first-in-time sequence, the data processing system configured to execute selected requests faster when executed in a predetermined sequence, the data processing system comprising:

queuing means for queuing the number of requests;

scheduling means coupled to said queuing means for scheduling selected ones of the number of requests in an order that corresponds to the predetermined sequence resulting in a number of scheduled requests; and execution means coupled to said scheduling means, said scheduling means sequentially providing the scheduled requests to said execution means in the order that corresponds to the predetermined sequence regardless of whether additional requests are provided to said queuing means before the scheduled requests are completely executed by said execution means.

18. A data processing system according to claim 17, wherein selected ones of the number of requests are provided to said queuing means after said scheduling means begins scheduling the selected ones of the number of requests.

19. A data processing system according to claim 17, wherein all of the number of requests are provided to said queuing means before said scheduling means begins scheduling the selected ones of the number of requests.

20. A data processing system having a memory with a number of addressable memory locations, each of the addressable memory locations capable of storing a data word, the data processing system comprising:

memory requester means capable of issuing a number of sequential requests including a read request and a write request, the read request for reading a read data word from a selected addressable memory location of the memory, and the write request for writing a write data word to a selected addressable memory location of the memory;

scheduling means coupled to said memory requester means for scheduling selected ones of the number of requests for execution, said scheduling means scheduling a predetermined number of read requests for execution, followed by a predetermined number of write requests for execution; and execution means coupled to said scheduling means for executing the selected number of read requests and the selected number of write requests.

21. A method according to claim 1 wherein the predetermined number of the first requests of the first request type and the predetermined number of second requests of the second request type are selected to match the expected ratio of requests of the first request type and the second request type.

22. A method for scheduling and executing a number of first requests having a first request type and a number of second requests having a second request type that are stored in a queue of a data processing system, the data processing system configured such that execution of two requests of the first request type or two requests of the second request type is faster than the execution of a request of the first request type followed by a request of the second request type, the method comprising the steps of:

scheduling all but "n" of the first requests of the first request type, where "n" is greater than zero;

executing the scheduled first requests;

scheduling all but "m" of the second requests of the second request type stored, where "m" is greater than zero; and executing the scheduled second requests.

* * * * *